(12) United States Patent
Deppe et al.

(10) Patent No.: US 9,095,023 B2
(45) Date of Patent: Jul. 28, 2015

(54) LED RETROFIT LAMP

(75) Inventors: Carsten Deppe, Aachen (DE); Georg Sauerländer, Aachen (DE); Harald Josef Günther Radermacher, Aachen (DE); Haimin Tao, Eindhoven (NL); William Peter Mechtildis Marie Jans, Born (NL)

(73) Assignee: KONINKLIJKE PHILIPS N.V., Eindhoven (NL)

( * ) Notice: Subject to any disclaimer, the term of this patent is extended or adjusted under 35 U.S.C. 154(b) by 263 days.

(21) Appl. No.: 13/879,838

(22) PCT Filed: Oct. 11, 2011

(86) PCT No.: PCT/IB2011/054477
§ 371 (c)(1),
(2), (4) Date: Apr. 17, 2013

(87) PCT Pub. No.: WO2012/052875
PCT Pub. Date: Apr. 26, 2012

(65) Prior Publication Data
US 2013/0221867 A1 Aug. 29, 2013

(30) Foreign Application Priority Data

Oct. 19, 2010 (EP) .................................... 10188037

(51) Int. Cl.
*H05B 33/08* (2006.01)

(52) U.S. Cl.
CPC ........ *H05B 33/0815* (2013.01); *H05B 33/0809* (2013.01); *Y02B 20/383* (2013.01)

(58) Field of Classification Search
USPC ................................. 315/207, 224, 247, 306
See application file for complete search history.

(56) References Cited

U.S. PATENT DOCUMENTS

| 7,510,299 | B2 | 3/2009 | Timmermans et al. | |
|---|---|---|---|---|
| 8,076,920 | B1 * | 12/2011 | Melanson | 323/299 |
| 8,653,759 | B2 * | 2/2014 | Vigh et al. | 315/310 |
| 2009/0303720 | A1 | 12/2009 | McGrath | |
| 2010/0033095 | A1 | 2/2010 | Sadwick | |

FOREIGN PATENT DOCUMENTS

| DE | 19943256 A1 | 3/2001 |
|---|---|---|
| WO | 0101385 A1 | 1/2001 |

* cited by examiner

Primary Examiner — An Luu
(74) Attorney, Agent, or Firm — Yuliya Mathis

(57) ABSTRACT

The present invention relates to an LED lamp (1) adapted for operation with an alternating current. The LED retrofit lamp (1) comprises a LED unit (7, 7', 7", 7''') and a compensation circuit with a controllable switching device (9, 9'), connected parallel to said LED unit (7, 7', 7", 7''') to provide an alternate current path. A control unit (10, 10', 10") is adapted to control said switching device (9, 9') in a compensation mode in which said switching device (9, 9') is set to the conducting state for the duration of a shunt period in each half cycle of the alternating current to allow adapting the power/current of the inventive LED lamp (1), so that a versatile and optimized operation of the lamp (1) is possible.

12 Claims, 11 Drawing Sheets

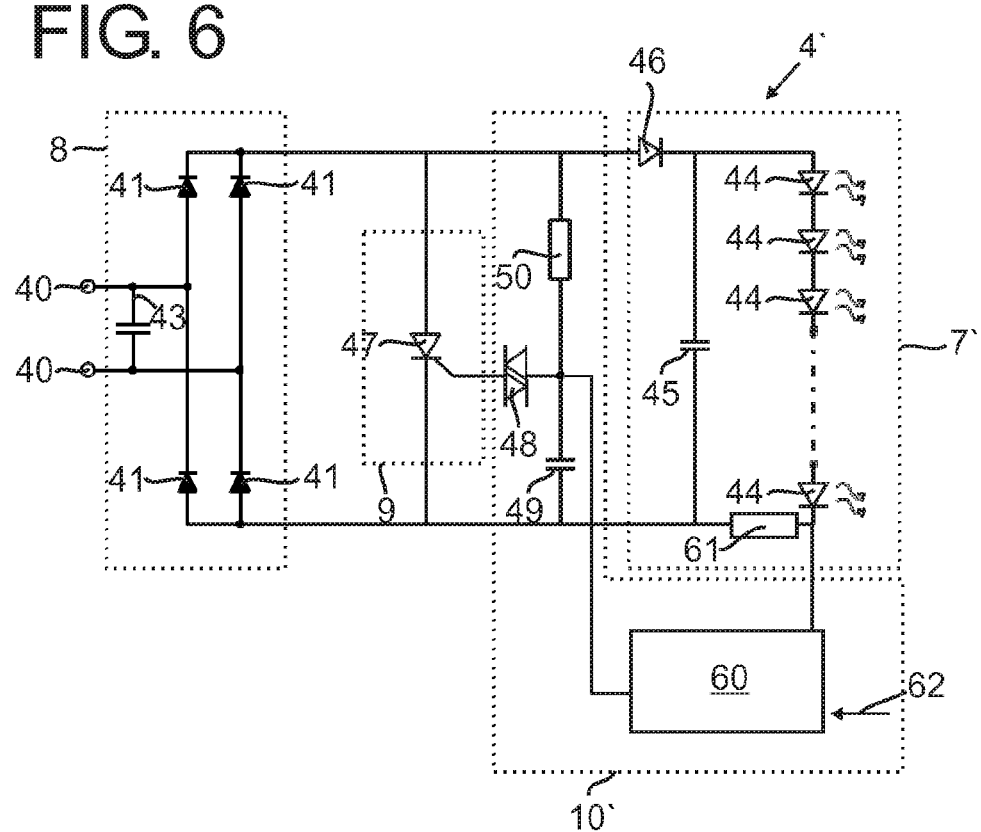
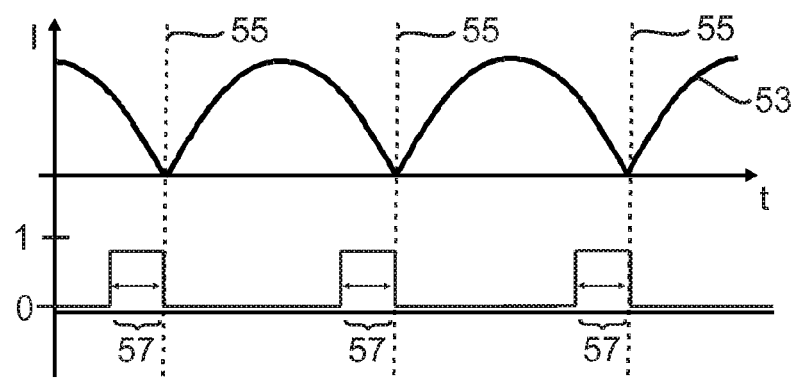

LED RETROFIT LAMP

The invention relates to the field of lighting and particularly to an LED retrofit lamp adapted for operation with an alternating current.

BACKGROUND OF THE INVENTION

Recently, lighting devices have been developed utilizing light emitting diodes (LEDs) for a variety of lighting applications. Due to the increasing use of LEDs for lighting applications, LED lamps are developed to replace common incandescent or fluorescent lamps, i.e. for retrofit applications. In addition to an increase in the lifetime of such LED lamps in comparison to common lamps and thus lower cost, LED lamps typically contain less hazardous materials, so that recycling processes of such lamps can be conducted more efficiently.

For the above mentioned retrofit applications, the LED lamp typically is adapted to fit the socket of the respective fixture to be retrofitted. Furthermore, since a maintenance of a lamp typically is conducted by a user, the LED lamp should be readily operational with any type of suitable fixture without the necessity of an elaborate modification of the fixture.

LEDs typically exhibit a higher luminous efficacy than common light sources and thus draw less current from the power supply for a given luminous flux. While this fact is advantageous for the present efforts for energy conservation, difficulties might arise when retrofitting a fixture which is designed for a nominal power. Depending on the circuit design of the fixture, the differing current draw may result in significant electrical problems, such as overheating of the ballast or an inacceptably low power factor when operating a LED lamp with such fixture.

Therefore, it is an object of the present invention to provide an LED retrofit lamp for operation with an alternating current which may be manufactured cost-efficiently and allows a versatile and optimized operation, in particular with common types of fixtures.

SUMMARY OF THE INVENTION

The object is solved by an LED lamp according, an illumination system and a method of operating an LED lamp as described and claimed herein.

The basic idea of the invention is to provide an alternating current LED retrofit lamp with at least one LED unit, which lamp may be operated corresponding to given electrical specifications, such as power consumption, current and/or luminous flux in accordance with the application, i.e. the specifications of a given power supply unit or a lamp ballast of a fixture. The inventive LED lamp thus allows an optimised operation without the necessity of a change in the configuration of e.g. said power supply unit or fixture. The LED lamp according to the present invention is thus particularly advantageous for the use in retrofit applications, i.e. for replacing a common fluorescent or gas-discharge lamp, since no alteration is necessary in the wiring of the fixture.

The inventive LED lamp is particularly advantageous when used connected with a lamp ballast having a power factor correction (PFC) circuit, since for such applications it is important to maintain the average current through the lamp in a defined range to obtain a satisfying compensation result and thus a high power factor. However, the inventive setup advantageously allows to operate the lamp also with a lamp ballast without a PFC circuit, so that a user may use the lamp in a variety of fixtures without detailed knowledge of the circuitry and type of ballast. Therefore, only one type of lamp is needed to retrofit a given type of fixture, which renders the installation process simple and the lamp cost-efficient.

According to the invention, the LED lamp is adapted for operation with an alternating current and comprises at least one LED unit, a compensation circuit with a controllable switching device, connected parallel to said LED unit to provide an alternative current path and a control unit, adapted to control said switching device in a compensation mode, in which said switching device is set to a conducting state for the duration of a shunt period in each half cycle of said alternating current. Depending on the control, the inventive LED lamp thus allows to adapt the electrical specifications, such as current or power consumption of the LED lamp and/or the LED unit to a predefined compensation value.

The inventive lamp is adapted for operation with an alternating current, such as for example provided by a 50/60 Hz mains supply line via a suitable power supply unit, e.g. a ballast unit of a lamp fixture.

The LED lamp according to the invention comprises at least one LED unit, which in terms of the present invention may comprise any type of solid state light source, such as an inorganic LED, organic LED or a solid state laser, e.g. a laser diode.

For general lighting applications, the LED unit may preferably comprise at least one high-power LED, i.e. having a luminous flux of more than 1 lm. Preferably, said high power LED provides a luminous flux of more than 20 lm, most preferred more than 50 lm.

For retrofit applications, it is especially preferred that the total flux of the LED unit is in the range of 300 lm-10,000 lm, which corresponds to a typical 5 W-80 W fluorescent tube lamp. Most preferably, the forward voltage of the LED unit is in the range of 50 V-200 V, particularly 70 V-150 V and most preferred 95 V-120 V.

The LED unit may certainly comprise further electric or electronic components, such as a driver unit, e.g. to set the brightness and/or color, rectifying circuitry, a smoothing stage, a filter capacitor and/or a discharging protection diode. The LED unit may comprise more than one LED, for example in applications where color-control of the emitted light is desired, e.g. using RGB-LEDs, or to further increase the luminous flux of the LED lamp. Furthermore, the LED lamp may comprise more than one LED unit, e.g. connected parallel to said compensation circuit.

The compensation circuit may be of any suitable type to provide an alternative current path, i.e. an electrical connection parallel to said LED unit, e.g. allowing to at least temporarily bypass the LED unit. The compensation circuit comprises at least a controllable switching device, so that the circuit may be switched or controlled at least to a conducting state and a non-conducting state.

In said conducting state, the compensation circuit provides an alternative current path, so that during operation, an operating current of the LED lamp is directed at least partly through the compensation circuit. In the non-conducting state, the compensation circuit shows a high resistance, so that no substantial current passes through the circuit, i.e. the residual current should preferably be less than 10 mA. Most preferably, the compensation circuit is open in the non-conducting state, so that the full current is available to drive the at least one LED unit.

The switching device may be of any suitable type to be recurrently controlled to the conducting and non-conducting state. As will be discussed in the following, at least one of the states can be set by the control unit. The switching device should in addition be adapted to the electrical specifications of the application in terms of maximal voltage and current, but also regarding switching frequency, i.e. to be set to the conducting state in each half cycle of the alternating current. The switching device may preferably comprise a tyristor, a triac or any suitable type of transistor, such as a MOSFET or bipolar transistor to set the state of the compensation circuit.

Beside the switching device, the compensation circuit may comprise further electric or electronic devices, e.g. a current-limiting device, such as a resistor or a reactive element, depending on the application.

Preferably however, the resistance of the compensation circuit is lower than the resistance of the LED unit, so that in the conducting state, the voltage across the compensation circuit and thus the LED unit is lower than in the non-conducting state. Most preferably, the voltage across the compensation circuit in the conducting state is less than 2V. Especially preferred, the compensation circuit is a low-resistance circuit, i.e. having a maximum resistance of 20 Ohm.

According to the invention, the compensation circuit is connected parallel to said LED unit. The LED lamp may certainly comprise further components, such as a housing, one or more lamp sockets adapted to the respective type of fixture, a smoothing stage, a flicker filter circuit and/or further control circuitry, e.g. to set the color of the emitted light in case of a RGB LED unit. The parallel circuit arrangement of the compensation circuit and the LED unit may be connected directly to said lamp socket or via further electric components. Preferably, the LED lamp comprises rectifying circuitry, connected in series between the lamp socket and said parallel circuit arrangement of compensation circuit and LED unit for providing a direct current to drive said LED unit. Alternatively, it is also possible that said rectifying circuitry is formed integrally with said LED unit, as discussed above.

The LED lamp may be adapted to be connected to a PL-type fluorescent lamp fixture. However, according to a preferred embodiment of the invention, the LED lamp comprises at least a first and second lamp cap. The lamp caps should be adapted to provide an electrical connection of the LED unit and the compensation circuit with the fixture respective and thus with power. The lamp caps may thus for example be provided with a corresponding contact element, such as a bi-pin base. For example, the lamp caps may have the electrical and/or mechanical properties of a T5 or T8-fluorescent lamp. Preferably, the LED lamp is a LED tube lamp, such as a linear tube lamp. Most preferably, the LED lamp is a double-capped tube lamp, e.g. having a first and second lamp cap, arranged on opposing ends of a housing.

The LED retrofit lamp according to the invention further comprises a control unit, adapted to control said switching device in a compensation mode. In this mode, the switching device is set to the conducting state for the duration of said shunt period in each half cycle of said alternating current, which e.g. may be supplied by a 50 Hz or 60 Hz lamp ballast.

The compensation circuit is thus recurrently activated, so that during operation the circuit provides an alternative current path to the LED unit in each half cycle of the alternating current and thus draws a defined current from the ballast or power supply.

The control unit according to the invention may be of any suitable type to enable a control of the switching device in the compensation mode as described above. The control unit may therefore comprise discrete and/or integrated electric or electronic components, a microprocessor and/or a computing unit, e.g. with a suitable programming. Preferably, the control unit is integrated with the switching device to provide a most compact setup.

Depending on the respective application, various control strategies may be applied. For example, the control unit may be configured to control the power consumption of the LED unit to a predefined compensation value, e.g. substantially corresponding (+−10%) to the luminous flux of a fluorescent lamp to be replaced. Alternatively or additionally, the control unit may be configured to control the overall power consumption of and/or the current through the lamp to a predefined compensation value for operation with a ballast with a PFC circuit.

As discussed above, the inventive LED lamp is particularly advantageous when used with a power supply or ballast having a PFC circuit since in such cases it is important to maintain the current in a defined range to obtain the desired compensation of reactive power. In particular in case of a parallel compensated ballast it is important to maintain a given current through the lamp, since the current through the parallel capacitance typically is fixed. Thus, the power factor of the overall arrangement mainly depends on the current through the series inductance and the LED lamp.

Therefore, in particular in case of such power supply or ballast, the control unit is preferably configured to control the current through the lamp to substantially correspond (+−10%) to the nominal current of the power supply or ballast, e.g. the fluorescent lamp to be replaced.

The inventive LED lamp is advantageously further compatible with a power supply without a PFC circuit, because the control of the shunt period allows a flexible control. In addition, the inventive LED lamp mainly is a resistive load and advantageously does not cause a substantial phase shift in the power supply, i.e. the alternating current and voltage. The LED lamp may thus be used with a variety of power supply circuits and respective fixtures, which renders the LED lamp particularly advantageous for retrofit applications.

According to a preferred embodiment, the control unit is configured to adapt the power consumption of the LED unit to a predefined compensation value. Since, as discussed above, during the conducting state, the compensation circuit provides an alternative current path, the voltage across the LED unit is accordingly reduced. Thus, the power consumption of the LED unit may be set by the control unit by variation of the duration of the shunt period, so that the power consumption may easily be set to the predefined compensation value.

The compensation value may be a fixed set-point value, e.g. factory set by the design of the control unit. Alternatively, the predefined compensation value may be variable, e.g. to be set by an installer using a corresponding user interface and stored in a memory device, connected with the control unit. Thus, the installer may set the power consumption of the lamp easily according to the respective application. Certainly, the term predefined compensation value may refer to a range, i.e. a minimum and maximum compensation value.

In the conducting state, the compensation circuit draws a certain current, e.g. from the power supply or ballast. Therefore, a current-limiting device may be provided in series to the parallel circuit arrangement of LED unit and compensation circuit to avoid that the current in the compensation circuit exceeds a safe level.

Alternatively or additionally, the LED lamp may be adapted for operation with a reactive lamp ballast, such as e.g. a magnetic ballast unit of a typical fluorescent lamp fixture. Here, at least one reactive element, e.g. an inductance and/or capacitance, is connected in series to the lamp and thus limits the maximal current through the lamp. Thus, the control unit may provide control of the power consumption of the LED unit to the predefined compensation value without the need for additional current-limiting devices in the lamp. According to the present embodiment, it is thus possible to adapt the power consumption of the LED unit by corresponding control, while simultaneously a current path through the lamp is provided even during said shunt period, so that the current through the lamp can be maintained according to the nominal current of the respective ballast, e.g. the nominal current of the fluorescent lamp to be replaced.

Certainly, the power supply or ballast may comprise more than one reactive element. For example and in a typical parallel compensated fluorescent lamp ballast, the series inductance is compensated by a parallel PFC circuit having a suitable capacitance.

As discussed above, the control unit in said compensation mode is adapted to set the switching device to the conducting state for the duration of the shunt period in each half cycle of said alternating current. In particular in the case of a reactive lamp ballast, the switching device is preferably set to the conducting state during a reactive phase of said alternating current.

When using the lamp in combination with a reactive ballast or power supply, the series reactive element causes a phase shift of the supply current to the voltage. Thus, the supply provides power with effective and reactive phases. In the present context, the term "reactive phase" refers to an interval, where the product of voltage and current, supplied to the ballast, is negative, so that no effective or real power is delivered to the load, i.e. the setup of ballast and LED lamp. According the present embodiment, the switching device is controlled to the conducting state during a reactive phase of said alternating current. Since effective power is transferred from e.g. the mains grid to the ballast during an active phase, it is thus advantageously possible to decrease the power dissipation of the ballast, so that the present embodiment provides reduced heat generation in the ballast and lamp; resulting in correspondingly reduced loss.

According to a further preferred embodiment of the invention, the switching device is controlled so that a shunt begin time or shunt end time of said shunt period corresponds to a zero-crossing of said alternating current.

In the context of the present invention, the terms "shunt begin time" and "shunt end time" refer to the moment of the change of state of the switching device from the non-conducting to the conducting state and from the conducting to the non-conducting state, respectively, i.e. the begin and end timing of the shunt period in the half cycle of the alternating current. The term "zero-crossing" refers to a moment of substantially no current flow in each half cycle, i.e. when the alternating current approaches a zero-point, e.g. within an interval of +−1 ms prior or subsequent to the zero-crossing of the alternating current.

The present embodiment is particularly advantageous because at least one change of state of the switching device in each half cycle is conducted at a moment, where the current is substantially zero, resulting in a higher lifetime of the switching device and improved electromagnetic compability of the LED lamp. Furthermore, the present setup allows a further simplified and thus more cost-efficient circuit setup.

For example, the switching device may comprise a self-latching switching device, which is set to the non-conducting state when the current is below a defined holding current, e.g. near zero and thus may be referred to as zero-crossing detector. The self-latching switching device may e.g. comprise at least one tyristor or triac, which upon activation provides a self-actuating reset when the alternating current approaches said zero-crossing. Thus, the control and the corresponding setup of the circuit is further simplified.

In the particular case of a connection of the lamp to a reactive power supply having a series inductance, such as e.g. in an inductive lamp ballast, it is preferred that the switching device is controlled so that said shunt end time corresponds to the zero-crossing of said alternating current to further decrease the power dissipation in the ballast. The power consumption and the duration of the shunt period is then controlled by the control unit, e.g. by a corresponding control of the timing of the shunt begin time. Therefore, the present control is also referred to as "leading edge control".

In case of a capacitively series compensated ballast, i.e. a capacitive ballast, such as for example used in some typical "duo" fluorescent lamp fixtures for one of the lamps in a capacitive branch of the circuit, it is preferred that the switching device is controlled so that said shunt begin time corresponds to said zero-crossing of said alternating current.

Since here, the phase shift of the series capacitance causes the current to lead the voltage, the control according to the present embodiment is advantageous to decrease the power dissipation in said capacitive ballast. The present control is in the following also referred to as "trailing edge control".

To set the above discussed preferred modes of operation, the control unit may comprise a corresponding switch, so that an installer may set the control mode of the switching device either to the leading edge control in case of an inductive ballast or to the trailing edge control mode in case of a capacitive ballast. Alternatively or additionally, the control unit may preferably be adapted to operate in one or more detection modes to automatically determine the most suitable control method, which is in the following discussed with reference to a further preferred embodiment of the invention.

According to a preferred embodiment, a voltage control circuit is connected parallel to the LED unit and the compensation circuit to adapt the forward voltage of the LED unit, e.g. in dependence of the current through the LED unit. The voltage control circuit may e.g. provide a reduction of the overall forward voltage of the LED unit by a controllable shunting of a part of the LEDs. Thus, it is possible to provide a further enhanced control of the power consumption of the LED unit by a corresponding reduction of the forward voltage. The voltage control circuit e.g. comprises a suitable switch to activate a further circuit, shunting at least one of the LEDs of the LED unit, but providing that at least one of the LEDs is still connected with power. The switch may be operated in accordance with a given current level reached.

Preferably, the control unit may comprise a detector to determine a zero-crossing of said alternating current. The present embodiment advantageously provides a more flexible control of the timing and in particular the phasing/position of the shunt period in each half cycle of the alternating current.

The detector may be of any suitable type to determine said zero-crossing of the current. For example, the control unit may comprise a microprocessor unit together with a suitable current detector, connected with the parallel circuit arrangement of LED unit and compensation circuit. The control unit may then control said switching device and thus the shunt begin and/or shunt end time, e.g. according to the desired duration of the shunt period and the respective type of ballast, as discussed above. The detector may for example comprise a current measurement circuit for determining the current through the lamp, e.g. the parallel circuit of compensation circuit and LED unit.

Alternatively or additionally and particularly in case of the above mentioned self-latching switching device, the control unit preferably comprises a threshold device, connected to said switching device. The threshold device may for example comprise a suitable type of DIAC, UJT (programmable unijunction transistor) or a comparator circuit having a suitable reference voltage. In case of a voltage driven threshold device, such as a DIAC, a driving circuit may be arranged to provide a voltage to the threshold device, which voltage is in a defined relation to the alternating current. Said driving circuit may additionally provide a delay period and/or comprise a voltage averaging stage. The driving circuit may e.g. be a RC-circuit, connected with said threshold device.

In case the threshold device is used in connection with said self-latching switching device, the threshold device may e.g. be used to trigger said switching device to the conducting state according to the predefined relation to said zero-crossing. The self-latching switching device is then reset upon the next zero-crossing and the procedure is repeated in the subsequent half cycle of the alternating current.

According to a further preferred embodiment of the invention, the control unit is adapted to control the shunt begin time of said shunt period, so that the switching device is set to the conducting state after a first delay period after a zero-crossing of said alternating current.

The embodiment allows to easily set the shunt begin time in relation of the zero-crossing of the alternating current, which enables a flexible control of the shunt period and thus the power consumption of the LED unit.

In a further preferred embodiment, the control unit is further adapted to control the shunt end time of said shunt period, so that said switching device is set to a non-conducting state after a second delay period after a shunt begin time of said shunt period. The present embodiment exhibits the advantage of a most flexible control of the shunt period and thus the power consumption/current of the lamp and/or LED unit, while still providing a rather simple setup. For example, it is possible to control the shunt period so that both, said shunt begin time and said shunt end time do not correspond to the zero-crossing of the alternating voltage, in the following referred to as "dual edge control".

The control unit may e.g. comprise at least one electronic timer to provide the respective control signals after expiration of the first and/or second delay period. Certainly, the timer may be provided integrally with a microprocessor. Alternatively or additionally, RC-circuits may be used to provide said first and/or second delay period.

The first and/or second delay period may be fixed and for example factory set. Alternatively, the delay periods may be set by the installer using the above discussed used interface.

To further enhance the operation of the inventive LED lamp, the control unit may preferably comprise feedback circuitry, also referred to as "feedback unit" or "feedback circuit", to measure a current and/or voltage of said LED lamp. The feedback circuitry may be of any suitable type to measure the current and/or voltage of the LED lamp and thus e.g. the power consumption, so that during operation, the power consumption of the LED lamp and/or LED unit may be adapted to the compensation value according to the measurement of the actual consumption, i.e. in a closed-loop operation. This embodiment is particularly advantageous, since the electrical characteristics of electronic components might change with temperature or due to aging. The feedback circuitry may e.g. be provided to measure the current and/or voltage of the parallel circuit arrangement of LED unit and compensation unit. Alternatively or additionally, the feedback circuitry may be provided to measure the current and/or voltage of the LED unit and/or the compensation circuit.

The measured current and/or voltage may be used to set the duration of the shunt period, e.g. according to the control modes and timing procedures discussed above. In particular, the control unit may comprise a PI- or PID-controller to allow a reliant and quick control of the power to meet the predefined compensation value.

Preferably, the feedback circuitry is coupled to said control unit to set said first and/or second delay period according to said measured current and/or voltage.

According to a development of the invention, the control unit is further adapted to operate in a first detection mode, in which the switching device is operated with a first set of timing control parameters, so that a shunt end time of said shunt period corresponds to a zero-crossing of said alternating current. Then, the current of said LED lamp is determined. Following the measurement, the switching device is operated with a second set of timing control parameters, so that said shunt end time does not correspond to a zero-crossing of said alternating current. The current of the LED lamp is again determined and in case the determined current according to said first set is less than said determined current according to said second set, the switching device is operated with said first set of timing control parameters.

The operation in the above first detection mode allows to operate the LED lamp most efficiently, in particular in case the lamp is used in connection with a reactive ballast unit, as described in the preceeding. As discussed above, it is preferable to operate the switching device when using an inductive ballast with a leading edge control, where the shunt end time is set to correspond to the zero-crossing of the current. In case, e.g. an inductive ballast is driven using trailing edge control, a relatively high ballast loss might result, which may cause temperature problems. Since it is typically not apparent to an installer, which type of lamp ballast is present in the fixture to be retrofit, the present embodiment advantageously allows to determine the specific type of ballast to allow a most suitable control method.

The first detection mode may be initiated automatically upon connection of the LED lamp to power. Alternatively or additionally, the first detection mode may be started by the installer, e.g. using the already discussed user interface.

Once the first detection mode is initiated, the control device operates the switching device with a first set of control parameters, so that said shunt end time corresponds to a zero-crossing of said alternating current, i.e. a leading edge control method. The duration of the shunt period, i.e. the shunt start time may be chosen according to the application. For example, it may be possible to start with a default duration suitable to adapt the power consumption of the lamp to a compensation value suitable for most applications.

Preferably, the switching device is operated with said first set of control parameters for multiple half cycles of the alternating current, i.e. a stabilization period, so that the lamp power and thus the current reaches a stable level.

The current of the LED lamp is then determined and e.g. stored in a suitable memory of the control unit, such as in a memory of a microcontroller. The current may be determined by said feedback circuitry, as discussed above, which may be provided to measure the current and/or voltage of the parallel circuit arrangement of LED unit and compensation unit. Alternatively or additionally, the feedback circuitry may be provided to measure the current of the LED unit and/or said compensation circuit.

The switching device is subsequently operated with a second set of control parameters with a shunt end timing, different from said first set of timing control parameters. The second set of timing control parameters may correspond to said trailing edge control, so that said shunt begin time is set to correspond with the zero-crossing of the current.

However, it is preferred that according to the second set of timing control parameters, the shunt period is offset against the shunt period according to the first set of control parameters by a predefined detection offset. Most preferred, the detection offset is in the range of 1 ms-3 ms and especially preferred 2 ms for a mains frequency of 50 Hz-60 Hz.

Especially preferred, the duration of the shunt period of said second set of control parameters corresponds to the duration of said first set.

The current of said LED lamp is then again determined, preferably after said stabilization period. The at least two determined currents are compared, e.g. by said microcontroller. In case the power consumption of the lamp and thus—since the voltage is constant—the current according to said first set is lower than the current according to said second set, an inductive ballast is determined. Accordingly, the switching device is operated with trailing edge control to provide a reduced ballast loss. The first detection mode then ends and the lamp may preferably be operated in said compensation mode with the determined control parameters, as discussed above.

In case the above mentioned comparison results in a reduced power consumption of said second set of control parameters, the switching device is most preferably operated according to said trailing edge control, i.e. so that said shunt begin time corresponds to a zero-crossing of said alternating current.

According to a further preferred embodiment of the invention, an additional controllable load switch is provided, arranged in series with said LED unit to at least temporarily disconnect said LED unit from power.

The load switch may be of any suitable type to be controlled at least to a conductive and a non-conductive state, e.g. by the control unit over a corresponding control connection. The load switch e.g. may comprise one or more transistors, such as bipolar transistors or MOSFETs. The load switch provides an operation of the lamp in the idle state, without the LED unit being connected with power, i.e. without being provided with said alternating current. The load switch is particularly useful in a second detection mode, described in the following.

As discussed above, the load switch is arranged to control the connection of said LED unit with power. Accordingly, the load switch may in one example be arranged parallel to said compensation circuit, preferably integrated with said LED unit. To provide the above operation in the idle state, the switching device of said compensation circuit in this case should be set non-conductive. Alternatively, the load switch may be provided to control the connection of the overall parallel arrangement of the LED unit and the compensation circuit with power.

According to the above, the load switch allows to operate the lamp in the idle state. Such operation may be particularly advantageous for operation in the second detection mode.

According to a development of the invention, the control unit is adapted to operate in the second detection mode, in which the load switch is controlled to disconnect the LED unit from power. Then the voltage at said LED lamp is determined and compared with a voltage threshold. In case the determined voltage corresponds to said threshold, i.e. is equal to or higher than said threshold, the switching device is operated with a third set of timing control parameters. Otherwise, i.e. when the determined voltage is lower than said threshold, the switching device is operated with a fourth set of timing control parameters, wherein the shunt period according to said third set of timing control parameters in each half cycle of said alternating current does not substantially overlap with the shunt period according to said fourth set of timing control parameters.

The present embodiment accordingly provides an operation of said switching device according to a third and a fourth set of parameters in dependence of the voltage, present at the lamp without a load, i.e. in said idle state. Certainly, the load switch should preferably be closed prior to the operation according to said third and fourth set of timing control parameters to render the LED unit operational.

While the operation in said first detection mode, described in the preceding, is useful for determining, whether the lamp is connected to an inductive or capacitive ballast in a 50 Hz mains grid system, the operation in said second detection mode is particularly advantageous when the lamp is employed with a so-called "dual lamp rapid start ballast", typically used in 60 Hz mains grid systems. In contrast to the above discussed ballast types, here two lamps are connected in series with each other and with an autotransformer. The ballast further typically includes a starter capacitor, connected parallel to one of the lamps and auxiliary cathode heater circuits, provided to ignite connected fluorescent lamps.

The operation according to said third and fourth timing control parameters allows an enhanced operation, when using two lamps according to the invention with a rapid start type of ballast, because the shunt periods of the two lamps do not substantially overlap.

Due to the design of said rapid start type of ballast unwanted losses may occur due to excessive current flow in case the switching devices of both lamps would be set to the conductive state simultaneously. Accordingly, the power factor of the overall setup can be enhanced when using the inventive lamp with a dual lamp rapid start type of ballast.

In the present context, "no overlap" accordingly is understood to provide that when two lamps are operated simultaneously, the positioning of the shunt period of the first lamp differs from the positioning of the shunt period of the second lamp in each half cycle of the alternating current, so that the switching devices of said two lamps are not set to the conductive state simultaneously. However, a small overlap (+/−2 ms) is possible and comprised according to the present explanation, since the autotransformer in the present type of ballast delays an excessive current flow even in case of such overlap.

To provide that one of the lamps in said rapid start type ballast is operated with said third parameters and the respective other lamp is operated with said fourth parameters, according to the present embodiment, the voltage at the lamp in an idle state is determined. Since, as mentioned above, typical dual lamp rapid start ballasts comprise a starter capacitor parallel to one of the lamps, a corresponding voltage, higher than said threshold voltage, will be present at one of the lamps in said idle state, while said voltage is not present at the respective other lamp. Thus the present embodiment allows to set one of the lamps according to said third set of parameters and the respective other lamp with the fourth set of parameters in dependence of the voltage in said idle state. A simultaneous shunting thus can be advantageously avoided.

The shunt period and duration according to third and fourth set of timing control parameters may be chosen according to the application, as long as the shunt periods do not substantially overlap. For example, the operation of the switching device according to said third set may correspond to trailing edge control, i.e. that the shunt begin time of said shunt period corresponds to the zero-crossing of the alternating current. To provide no overlap, the control unit may further be configured so that the operation of the switching device according to said fourth set of parameters corresponds to leading edge control, i.e. that the shunt end time corresponds to the zero-crossing.

Preferably however, according to said fourth set of parameters, the operation of said switching device corresponds to dual edge control to provide an even further increased power factor. Most preferably, the timing control parameters of said third and fourth set are chosen, so that the according shunt periods are successive, i.e. that the shunt end time according to the operation of one of the set of control parameters corresponds (+−4 ms) to the shunt begin time of the operation according to the respective other set of parameters.

The voltage threshold according to the present embodiment should be chosen according to the application and preferably in dependence of the voltage over the starting capacitor of the respectively used rapid start type ballast. Preferably, the voltage threshold substantially corresponds to 175V (+−10%), which provides the operation discussed above in typical rapid start ballasts. Most preferably, the voltage threshold is an exclude range, providing increased stability. For example, the switching device may be operated with said third set, in case the determined voltage is higher than 190 V and according to said fourth set when the voltage is lower than 160 V.

Although certainly the inventive lamp can be operated in an embodiment, where said control unit is adapted for operation according to the first or the second detection mode, respectively, it is preferred that the lamp allows operating according to both of said first and second detection mode.

Here, an installer may set the respective detection mode, using the above mentioned user interface. Alternatively or additionally and in view that the above type of dual lamp rapid start ballast is typically employed in 60 Hz power grids while the inductive/capacitive types are used in 50 Hz power grids, the control unit may further preferably comprise a frequency detector, so that the control unit operates according to said first detection mode in case a 50 Hz (+−4 Hz) alternating current is determined and according to said second detection mode in case a 60 Hz (+−4 Hz) alternating current is determined.

BRIEF DESCRIPTION OF THE DRAWINGS

The above and other objects, features and advantages of the present invention will become apparent from the description of preferred embodiments, in which:

FIG. 6 shows a schematic diagram of an electric lamp circuit according to a second embodiment, FIG. 7 shows a timing diagram of the embodiment of FIG. 6.

DETAILED DESCRIPTION OF EMBODIMENTS

Figure 1:
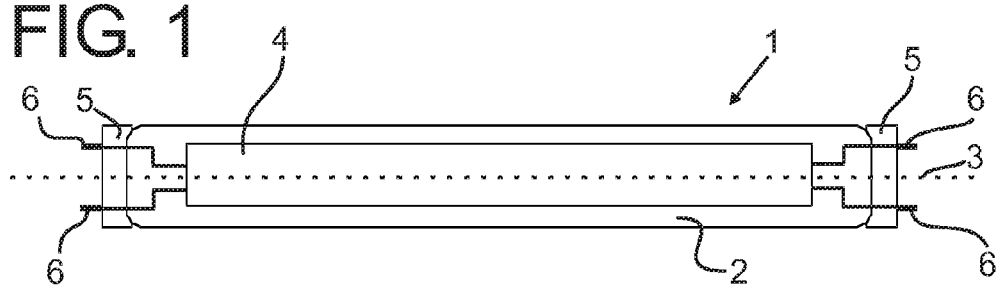
FIG. 1 shows an embodiment of an LED retrofit lamp according to the invention in a schematic side view.

FIG. 1 shows an embodiment of an LED retrofit lamp 1 according to the invention in a schematic side view. The LED lamp 1 comprises a tube-like housing 2, which extends along a longitudinal lamp axis 3. The housing 2 is made from transparent plastic material, e.g. a polymethylmethacrylate (PMMA). On each of the longitudinal ends of the lamp 1, lamp caps 5 with corresponding contact pins 6 are provided for connection to a typical lamp fixture, such as the fluorescent lamp fixtures 20, 20', shown in the schematic views of FIGS. 2a and 2b. Besides the electrical connection, the lamp caps 5 also provide mechanical fixation and support of the lamp 1 in the respective fixture 20, 20'. The LED lamp thus is a retrofit lamp, adapted for connection to a fixture 20, 20' for fluorescent linear tube lamps. In the present case, the LED lamp 1 is a replacement for a typical TL-D 36 W fluorescent lamp, i.e. for a T8-tube, having a length of approximately 120 cm.

The contact pins 6 of the LED retrofit lamp 1 are connected with an electric lamp circuit 4, which is explained in detail in the following.

Figure 2A:
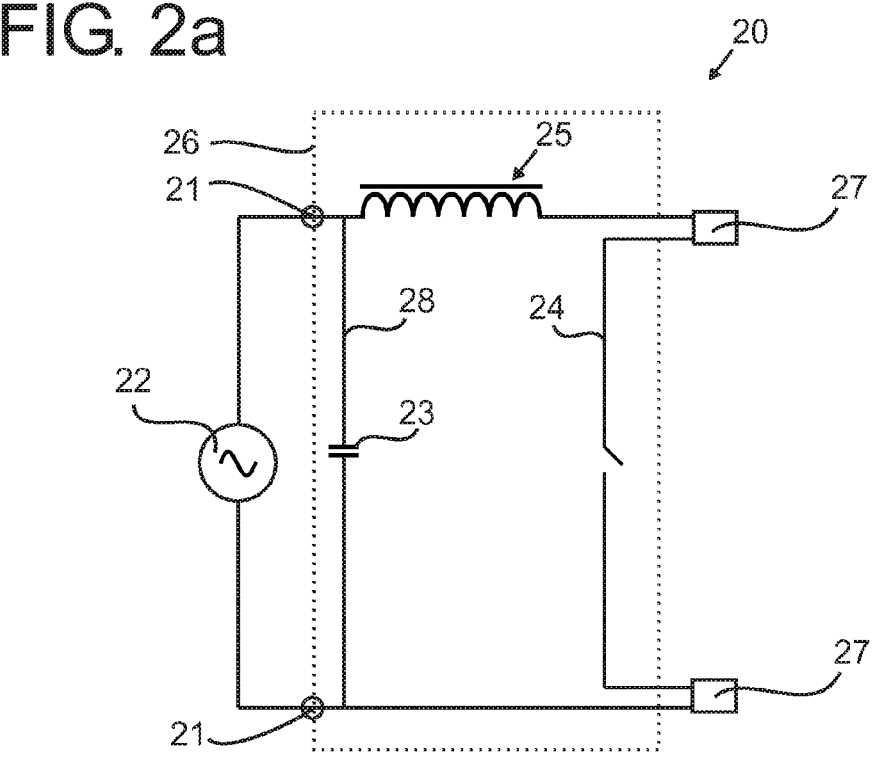
FIG. 2a shows a schematic circuit diagram of an exemplary fixture for use with the inventive LED lamp.

FIG. 2a shows a schematic circuit diagram of a typical embodiment of a fluorescent lamp fixture 20. The fixture 20 comprises terminals 21 for connection to a mains power supply 22, such as a 110/220V AC supply line. For the connection of a lamp, such as the LED lamp 1, two sockets 27 are provided, which according to the present example are of G13-type. The sockets 27 and thus an installed lamp 1 are connected with the mains power supply 22 over lamp ballast 26. The lamp ballast 26 comprises a series inductance 25, e.g. a suitable coil, which is usually employed to limit the current in case a fluorescent lamp is installed in the fixture 20 because of the negative impedance behavior of fluorescent lamps. The lamp ballast 26 is in the following also referred to as "reactive ballast".

Figure 5A:
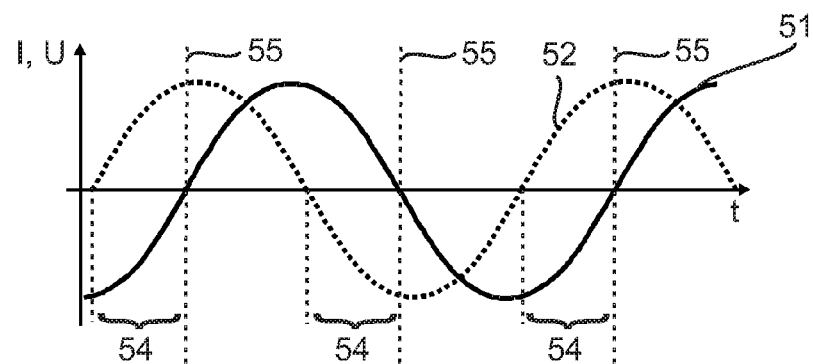
FIG. 5a shows a timing diagram of the phasing of current and voltage in an inductive ballast.

Because the series inductance 25 causes a phase shift when operated with an alternating current, as can be seen from FIG. 5a, a power factor correction (PFC) circuit 28 is connected parallel to the arrangement of series inductance and lamp 1, i.e. the ballast 20 thus is referred to as a parallel compensated "inductive or magnetic ballast".

The PFC circuit 28 comprises a suitable capacitor 23 so that the phase shift can be corrected, i.e. to obtain a sufficiently high power factor. As can be seen from FIG. 2a, typical fluorescent lamp ballasts 26 are provided with a parallel PFC circuit 28. Therefore, to provide a high power factor, the current through the series inductance 25 and thus the lamp 1 needs to be matched to the design of the PFC circuit 28, i.e. the nominal load of the ballast 26 and thus the fixture 20.

The ballast 26 further comprises an auxiliary circuit 24, which is employed to start a fluorescent lamp attached to the fixture 20. When using the fixture 20 with the inventive LED lamp 1, the auxiliary circuit is not necessary but may be left untouched, since the circuit 24 does not hinder the operation of the LED lamp 1.

Figure 2B:
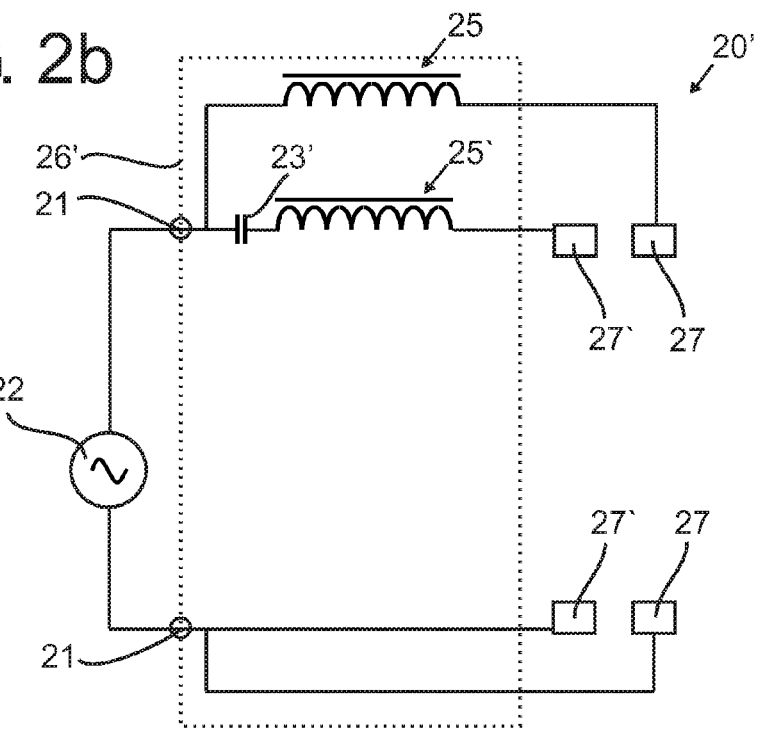
FIG. 2b shows a schematic circuit diagram of a second exemplary lamp fixture for use with the inventive LED lamp.

A second embodiment of a typical fluorescent lamp fixture 20' is shown in FIG. 2b in a schematic drawing. The lamp fixture 20' is adapted to hold two lamps 1 and is accordingly equipped with a first pair of sockets 27 and a second pair of corresponding sockets 27'. The first pair of sockets 27 are connected with power over the series inductance 25, as discussed above. The second pair of sockets 27' are connected with power in series with a further inductance 25' and a series capacitor 23'. According to the present example, the capacitor 23' is chosen with a sufficiently high capacitance so that the inductive power of both inductances 25, 25' are compensated. Therefore, a dedicated PFC circuit 28, as shown in FIG. 2a, can be omitted with this circuit design.

Figure 13:
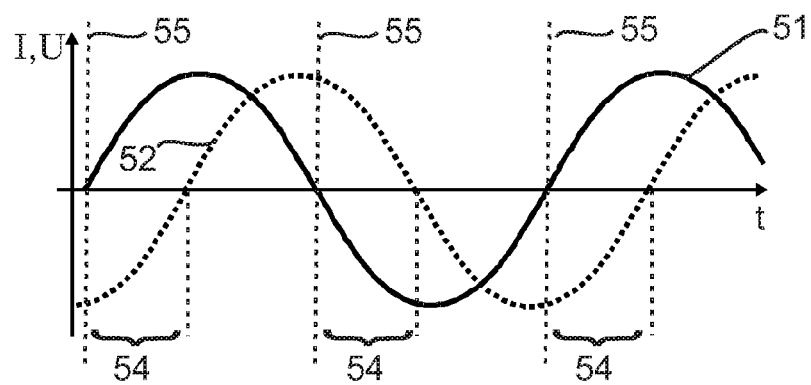
FIG. 13 shows a further timing diagram of the phasing of current and voltage in a capacitive ballast.

The reactive ballast 26' accordingly comprises an inductive branch, namely the circuit of inductance 25 and sockets 27, and a capacitive branch, i.e. the circuit of the capacitor 23', the inductance 25' and sockets 27'. While in the inductive branch, the phasing corresponds to FIG. 5a, i.e. the current 51 lags the voltage 52, in the capacitive branch, the phasing corresponds to FIG. 13, i.e. here the current 51 leads the voltage 52. Therefore, a lamp 1 connected to sockets 27 is provided with an inductive ballast, while a further lamp 1 connected to sockets 27' is provided with a capacitive ballast, so that the current through both lamps 1 compensate for each other, provided that the current and thus the power consumption in both lamps 1 substantially corresponds to each other. For reasons of clarity, corresponding auxiliary circuits 24 to start fluorescent lamps, connected to sockets 27 and 27' have been omitted in FIG. 2b.

Figure 3:
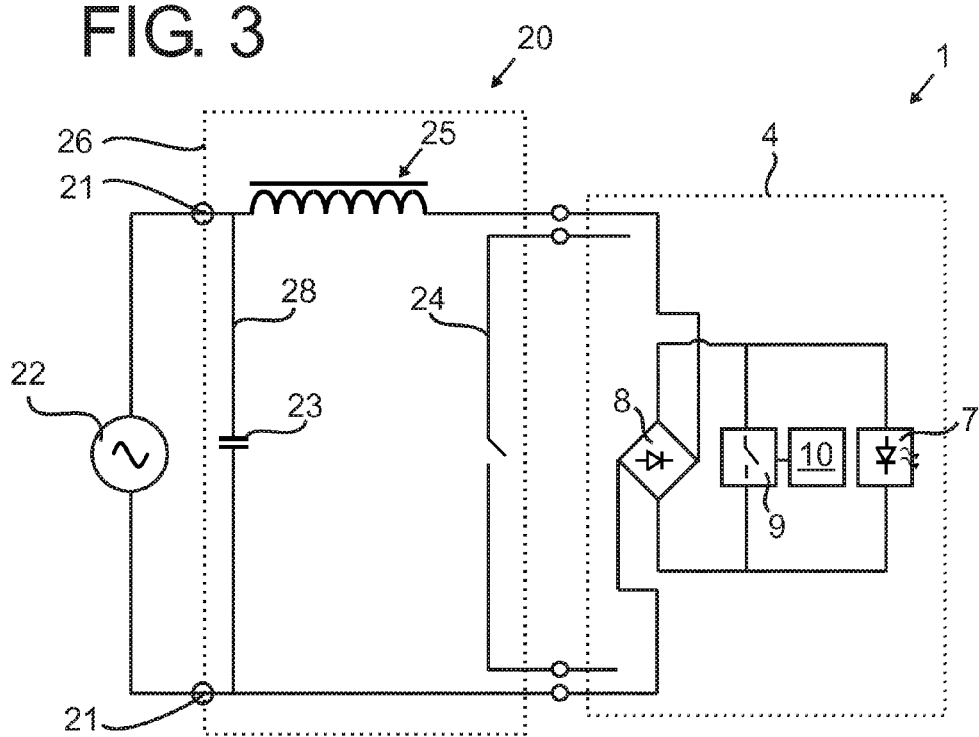
FIG. 3 shows the schematic circuit diagram of FIG. 2a with a connected LED lamp according to the embodiment of FIG. 1.

FIG. 3 shows the fixture 20 according to FIG. 2a with a connected LED lamp 1 according to FIG. 1. To not obscure the main aspects of the present explanation, all mere mechanical components, such as the housing 2 of the LED lamp 1 or the sockets 27 of the fixture 20 have been removed in the schematic diagram of FIG. 3.

As can be seen from the figure, the lamp circuit 4 of the LED lamp 1 is connected to the mains power supply 22 over the series inductance 25. As described above, the auxiliary circuit 24 is not used in the present embodiment. The electric circuit 4 of the LED lamp 1 comprises a rectifier 8, which converts the input alternating current 51, shown in FIG. 5a, into an output current 53 of constant polarity, as shown in the upper part of FIG. 5b. The output of the rectifier is connected to an LED unit 7, which comprises in the present embodiment several high (or medium) power LEDs, connected in series.

The LED unit 7 is connected in parallel to a compensation circuit having a controllable switching device 9. The controllable switching device 9 is driven by a control unit 10 to a temporarily short-circuit the LED unit 7 for the duration of a shunt period 57 in each half cycle of the alternating current 51 applied to the lamp 1. The lamp circuit 4 thus allows adapting the power consumption of the LED unit 7, independent from the forward voltage level of the LEDs.

The lamp 1 thus is particularly advantageous when employed in combination with a parallel compensated reactive ballast 26, as shown in FIG. 2a, since here it is important that the current through the lamp 1 meets the nominal load of the fixture 20 to achieve a high power factor. However, since the lamp 1 itself does not cause any substantial phase shift, the lamp 1 can also be utilized with an uncompensated magnetic ballast (not shown), since no reactive power is added. The LED lamp 1 thus is highly versatile.

Figure 4:
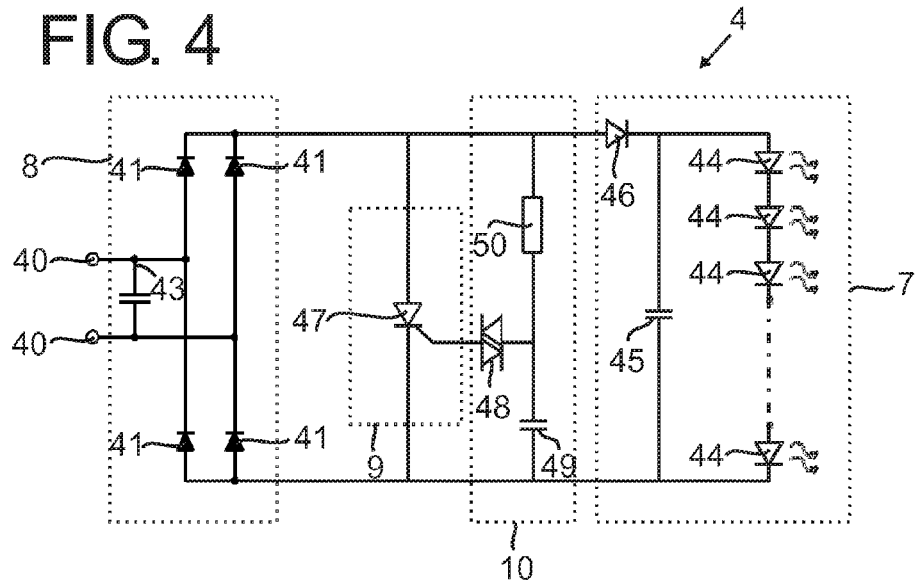
FIG. 4 shows a schematic diagram of an electric lamp circuit for an LED retrofit lamp according to a first embodiment.

A detailed embodiment of the lamp circuit 4 is shown in FIG. 4 in a schematic diagram. The circuit 4 is connected through the sockets 27 (not shown in FIG. 4) of the lamp 1 via corresponding terminals 40. The terminals are connected to the rectifier 8, which according to the present embodiment is a full-wave bridge rectifier comprising four diodes 41. A capacitor 43 is arranged to reduce electromagnetic interference. The input current 51, applied to the circuit 4 when operating the lamp 1 in e.g. fixture 20 is shown in the timing diagram of FIG. 5a together with the line voltage 52 of the fixture 20 at terminals 21 for a full cycle of the current 51. The output current 53 of the rectifier 8 is shown in the upper part of FIG. 5b.

The output of the rectifier 8 is connected to the parallel circuit of the switching device 9, control unit 10 and LED unit 7. As shown, the LED unit 7 comprises several high-power LEDs 44. The total forward voltage of the LEDs 44 is 100V and thus approximately matches the operating voltage of typical fluorescent lamps.

Furthermore, the LED unit 7 comprises a parallel connected smoothing capacitor 45 and a diode 46 to avoid discharging of the capacitor 45 when the switching device 9 short-circuits the LED unit 7.

According to the present embodiment, the switching device 9 is formed by a thyristor 47, i.e. a self-latching device, which gate terminal is connected to a DIAC 48 of the control unit 10. The DIAC 48 serves as a threshold device to provide a defined timing of the begin of the shunt-period 57 with respect to the zero-crossing 55 of the current 51. The control unit further comprises a timing capacitor 49 and a corresponding resistor 50. The capacitor 49 and the resistor 50 form an RC-circuit to provide the DIAC 48 with a timing drive signal, so that the arrangement of DIAC 48, capacitor 49 and resistor 50 forms a "timing circuit". As discussed in the following, the drive signal follows the current 51, but due to the characteristics of the RC-circuit, provides a given delay period after each zero-crossing 55 until the threshold voltage of DIAC 48 is reached.

The operation of the lamp circuit 4 during use is hereinafter explained with reference to FIGS. 5a and 5b.

Figure 5B:
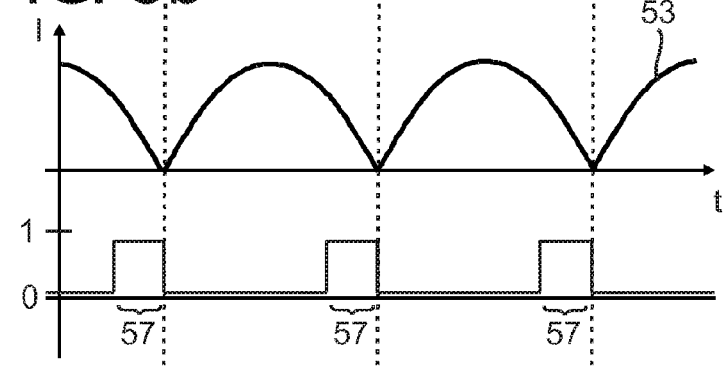
FIG. 5b shows a timing diagram of the operation of the embodiment according to FIG. 4.

As already discussed, FIGS. 5a and 5b show timing diagrams of the input alternating current 51 and the output current 53 at the output of the rectifier 8. Due to the reactive power of the series inductance 25, the line voltage 52 is phase shifted with respect to the input current 51. The input current 51 accordingly provides reactive phases 54, as indicated in FIG. 5a. During a reactive phase 54, no effective power is transferred from the power supply 22 to the series connection of inductance 25 and lamp 1.

Beginning with the moment of a zero-crossing 55 of the current—or with reference to the output current 53 shown in FIG. 5b a "zero-point"—the timing capacitor 49 is charged over the resistor 50. As the voltage during this phase is roughly constant at the level of the forward voltage of LEDs 44, charging of capacitor 49 is approximately a linear ramp unit the threshold voltage of DIAC 48 is reached. When the voltage reaches the threshold voltage of DIAC 48, a current flows into the gate terminal of the thyristor 47, controlling the thyristor 47 to a conducting state. The LED unit 7 is accordingly short-circuited. Due to the characteristics of thyristor 47, the device resets itself upon the next zero-crossing 55 of the alternating current. The state of the thyristor 47 and the according timing of the shunt period 57, i.e. a shunt begin and shunt end time, is shown in the lower part of FIG. 5b, where "0" represents the non-conducting state and "1" the conducting state of the thyristor 47.

As will become apparent from FIGS. 5a and 5b, the control of the thyristor 47 using the DIAC 48 and the RC-circuit provides a delay period after each zero-crossing of the current 51. According to the present example, the shunt period 57 is set to correspond with the reactive phase 54. Therefore, during the conducting state, the power dissipation in the ballast 26, 26' does not increase substantially. However, the LED unit 7 is short-circuited during the shunt period 57, so that no voltage is applied to the LED unit 7. Because the current 51 through the lamp 1 is limited by the series inductance 25, 25', the power consumption of the LED unit 7 is reduced.

This is particularly advantageous when using a common type of high-power LEDs 44, as mentioned above. When using the shown series connection of high-power LEDs 44 with a forward voltage of approx. 100V to meet the voltage of a fluorescent lamp to be replaced, the resulting current drawn by the LEDs 44 is significantly higher than the current of a typical fluorescent lamp and thus the nominal current of a typical ballast 26, 26' to provide a sufficiently high power factor. Accordingly, the present embodiment allows to set the power consumption of the LED lamp 1 to the desired level.

FIG. 6 shows a second embodiment of lamp circuit 4' of the LED lamp 1 in a schematic diagram. The present embodiment substantially corresponds to the embodiment of FIG. 4, with the exception that the control unit 10' comprises a feedback circuit 60. While in the embodiment of FIG. 4 the delay after the zero-crossing 55 until the thyristor 47 is set to the conducting state, is determined by arrangement of DIAC 48, resistor 50 and timing capacitor 49, the feedback circuit 60 allows to adapt the delay and thus the duration of the shunt period 57 according to the actual power consumption of the LEDs 44. Therefore, a variation in the power consumption of the LEDs 44 due to aging or temperature can be compensated.

The feedback circuit 60 is connected to a current sensing resistor 61 of the LED unit 7' to determine a voltage, corresponding to the present current through the LEDs 44. The thus obtained voltage is compared with a voltage reference 62, e.g. from a suitable voltage supply, to determine a variation in the power consumption assuming a constant voltage of LEDs 44. The feedback circuit 60 is further connected to the input of DIAC 48. Depending on the determined variation, the feedback circuit 60 "bleeds" or draws a corresponding current from the timing capacitor 59 to adapt the delay time and thus the duration of the shunt period 57, as shown in the lower part of timing diagram according to FIG. 7.

Figure 8A:
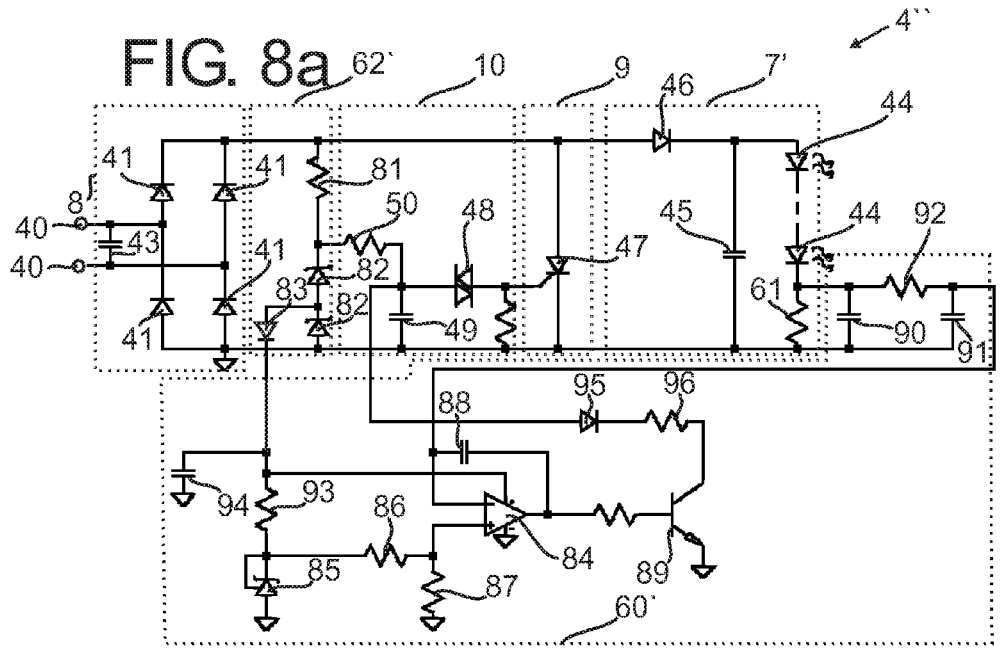
FIG. 8a shows a schematic diagram of an electric lamp circuit according to a third embodiment.

FIG. 8a shows a third embodiment of lamp circuit 4'' in a schematic diagram. The embodiment of FIG. 8 substantially corresponds to the embodiment of FIG. 6 with the exception of feedback unit 60' and a corresponding low voltage supply circuit 62'.

The low voltage supply circuit 62' comprises a resistor 81 and an arrangement of two zener diodes 82. A low voltage supply for the feedback unit 60' is coupled out via diode 83 and provides OP-amp 84 with operating power. Additionally, the voltage reference signal is generated from the arrangement of shunt voltage reference 85, e.g. TL341, resistor 93 and resistors 86, 87, which form a voltage divider. A capacitor 94 is provided as an energy buffer to smooth out the ripple in the low voltage supply.

The OP-amp 84 is connected with capacitor 88 to form an error integrator for the feedback control. The output of OP-amp 84 drives transistor 89, which draws a corresponding current from timing capacitor 49. Diode 95 inhibits current flow from the transistor 89 to the timing capacitor 49. Resistor 96 assures that the capacitor 49 is not directly shunted.

The resistor 61 is used as current sensing resistor, as discussed above. The circuit of capacitors 90, 91 and resistor 92 form a low pass filter to extract a DC component of the voltage across resistor 61. The DC voltage is then compared to the reference voltage at the positive input of OP-amp 84. The error is then integrated by capacitor 88 and OP-amp 84 to form the control signal for the transistor 89.

Figure 8B:
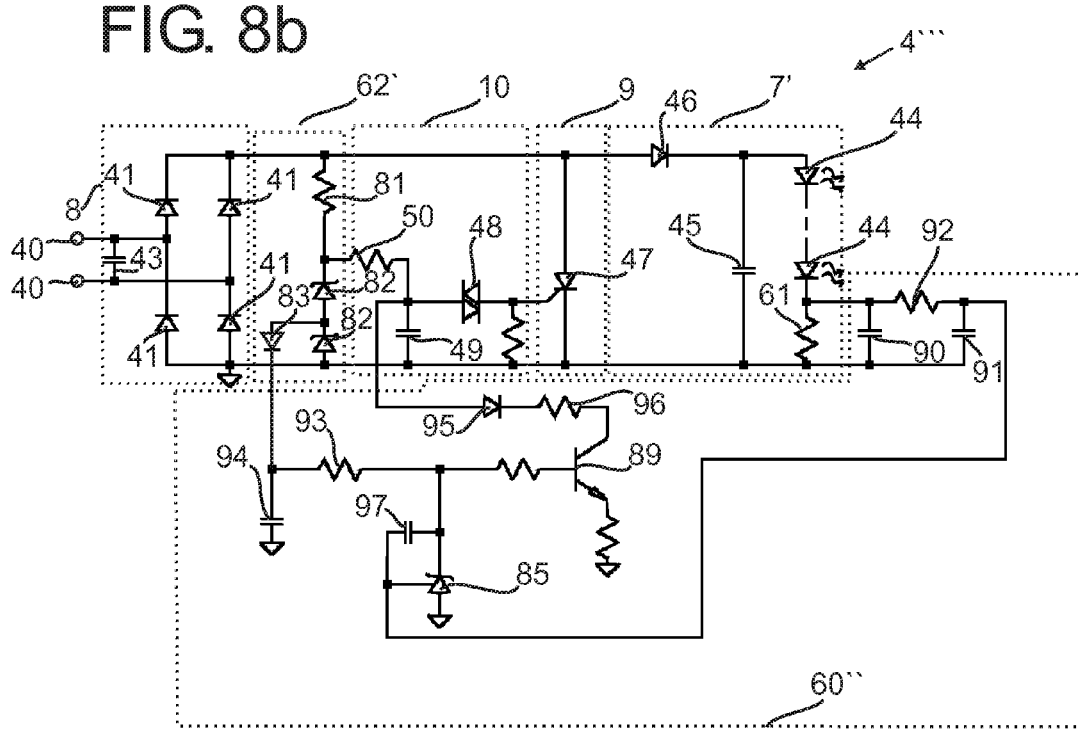
FIG. 8b shows a schematic diagram of an electric lamp circuit according to a fourth embodiment.

FIG. 8b shows a fourth embodiment of the electric circuit 4''' of an LED lamp 1. The embodiment of FIG. 8b substantially corresponds to the embodiment of FIG. 8a, with the exception of a simplified feedback unit 60'', which advantageously further reduces the overall cost of the LED lamp 1.

Figure 9:
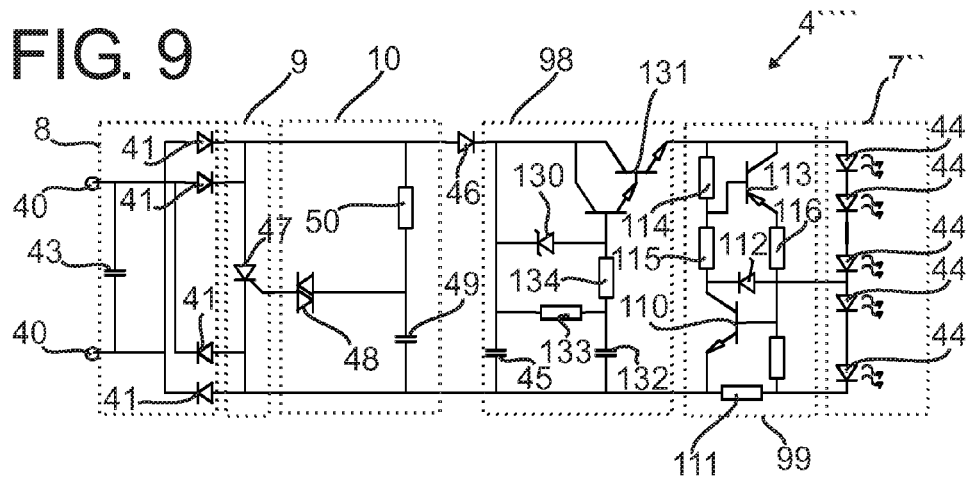
FIG. 9 shows a schematic diagram of an electric lamp circuit according to a fifth embodiment.

Different from FIG. 8, no operational amplifier is used to control the transistor 89 in the embodiment of FIG. 9. Instead an integration capacitor 97 is placed across the shunt voltage reference 85. The functionality of an error integrator and voltage reference are according to the present embodiment both provided by shunt voltage reference 85 and capacitor 97, which further simplifies the setup.

FIG. 9 shows a fifth embodiment of an electric circuit 4'''' of an LED lamp 1. The embodiment of FIG. 9 corresponds substantially to the embodiment of FIG. 4, with the exception of LED unit 7'' and additionally a filter circuit 98 and a voltage control circuit 99. Filter circuit 98 stabilizes the current for the LED unit 7'' to avoid visible flicker of the LEDs 44. Thus, the capacitance of capacitor 45 can be chosen relatively small. Capacitor 45 reduces the "ripple" of the voltage, supplied to the LED unit 7''. A second filter stage is formed by darlington transistor 131, resistors 133, 134 and capacitor 132. Resistor 133 and capacitor 132 form a RC highpass filter, dimensioned with a relatively small capacitance and high resistance, thus enabling the use of small and cheap components. The low ripple output voltage of this filter stage is amplified by transistor 131 to the full LED current level. Dimensioning of resistor 134 sets the maximal load on the RC filter output. In the phase where the input voltage is decreasing, the output of resistor 133 and capacitor 132 results that amplification transistor 131 can no longer operate. Current flows from capacitor 132 through resistor 134 and transistor 131 to the LEDs 44. This reduces the voltage on capacitor 132 to a value so that this phase is minimized and transistor 131 is kept in an operation voltage range most of the time. An additional zener diode 130 prevents high voltage levels on the capacitor 45 during startup. Since capacitor 132 is not charged in the first cycle after a startup, transistor 131 is not conductive and no current flows to the LEDs 44, thus capacitor 45 is charged with full mains voltage. For this time, diode 130 provides a second current path and enables immediate current flow as soon as the voltage reaches the zener voltage of diode 130. During normal operation, the maximal voltage across diode 130 is about the ripple voltage on capacitor 45 and thus is set to a non-conducting state.

The voltage control circuit 99 allows reducing the overall forward voltage of the LED unit 7'' by a controllable shunting of a part of the LEDs 44 by transistor 110. Thus, it is possible to provide a further enhanced control of the power consumption of the LED unit 7'' by a corresponding reduction of the forward voltage. Transistor 110 is controlled by the current through the LEDs 44. If the current through the LEDs 44 increases above a threshold, defined by resistor 111, e.g. if the voltage on resistor 111 increases above 0.7 V, transistor 110 is set conductive and short-circuits said part of the LEDs 44 through diode 112. Simultaneously, transistor 113 is activated through resistors 114 and 115. The corresponding current through resistor 116 keeps transistor 110 in the conducting state, while the voltage across resistor 111 is reduced to zero, since the current now flows through transistor 110. The latched state of the circuit 99 prevails until the lamp 1 is switched off, so once a high current is detected the circuit 4''' switches to an "high current" mode and is latched to this mode.

While the before-mentioned embodiments allow a relatively simple and thus highly cost-efficient circuit design, the control certainly is limited due to the thyristor 47, which links the end time of the shunt period 57 to the zero-crossing 55 of the alternating current 51.

Figure 10:
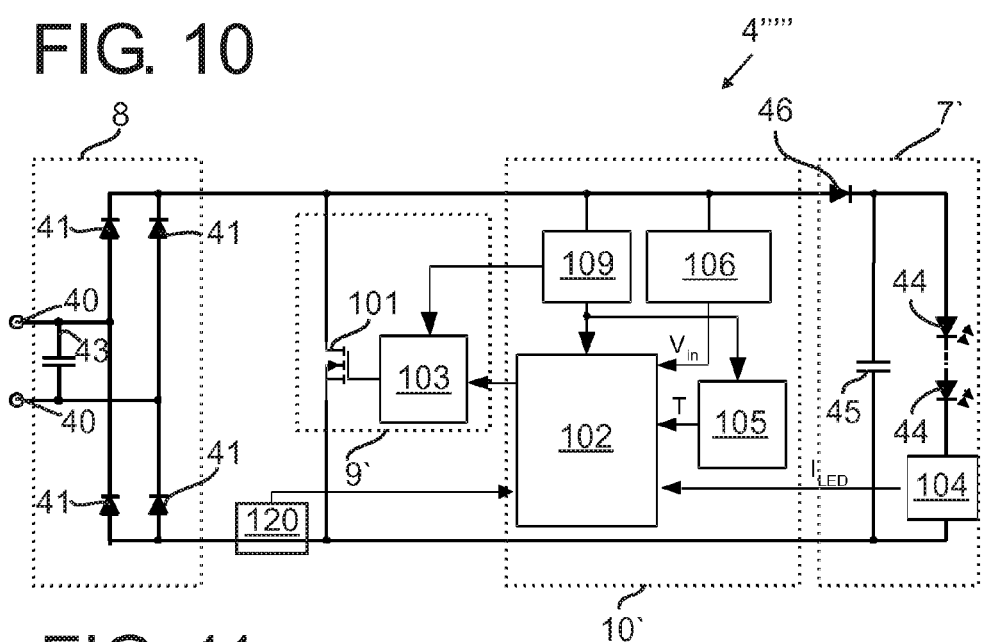
FIG. 10 shows a schematic diagram of an electric lamp circuit according to a sixth embodiment.

FIG. 10 shows a sixth embodiment of a lamp circuit 4'''', which allows a highly flexible control. According to the present embodiment, the switching device 9' comprises a MOSFET 101 to at least temporarily shunt the LED unit 7'. The gate terminal of the MOSFET 101 is connected to a microprocessor 102 using a suitable gate driver unit 103. The microprocessor 102 comprises a feedback circuit, connected to current detectors 104 and 120, which may be e.g. simple sensing resistors as explained with reference to FIG. 6. A temperature sensor 105 is further connected to the microprocessor 102 to provide overheating protection. Furthermore, a voltage detector 106 senses the voltage of the output of rectifier 8. A low voltage power supply 109 provides a suitable voltage to the gate driver unit 103, the microprocessor 102 and temperature sensor 105. As discussed above, the embodiment according to FIG. 10 allows a more flexible control of timing and the duration of the shunt period 57 so that the present embodiment advantageously allows a larger control range. The microprocessor 102 is provided with a suitable programming according to the application. For example, the microprocessor 102 may be programmed with a first and second timer to set the shunt begin time according to a first delay period in response to a zero-crossing 55 of the current 53. The duration of the shunt period and thus the amount of power reduction then is set by said second timer, which controls the shunt end time after to be set to a second delay period after the shunt period is started.

Figure 11:
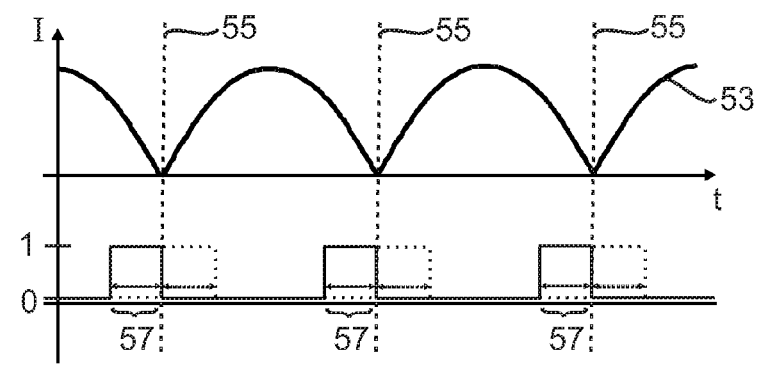
FIG. 11 shows a further timing diagram of the operation of an LED lamp according to the embodiment of FIG. 10.
Figure 17:
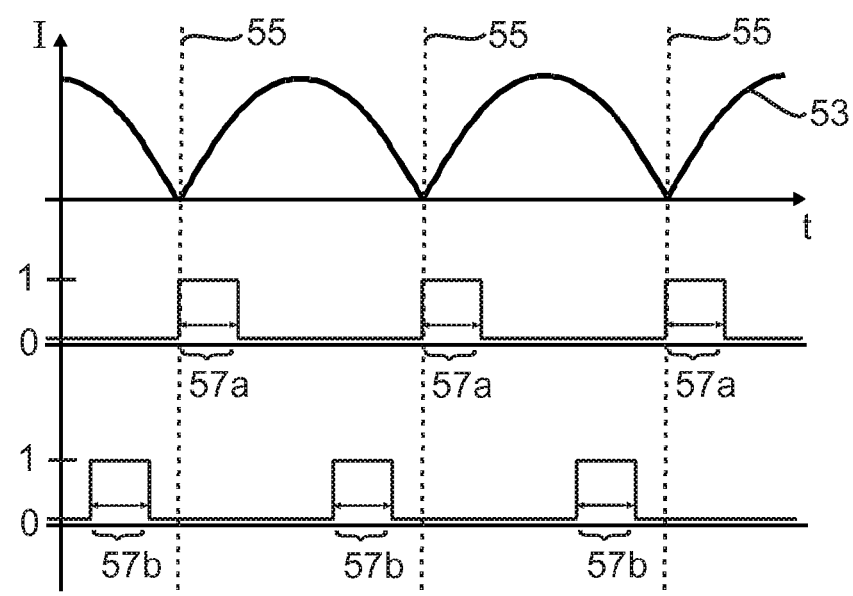
FIG. 17 shows a further timing diagram of the operation of two LED lamps according to the embodiment of FIG. 15

As shown in the timing diagram of FIG. 11, the present embodiment thus allows controlling the shunt period 57 so that the shunt begin time is set to the zero-crossing 55 of the current 51. Alternatively, it is further possible to adjust the shunt end time to the zero-crossing 55, as shown in FIG. 11 by the dotted lines. Further, it is possible to control the shunt period 57, so that both, shunt begin and shunt end time are different from zero-crossing 55, as shown in the lower part of FIG. 17. The shunt period 57 thus can be freely positioned within said half-cycle of current 51, also referred to as "dual edge control", e.g. start in a first half-cycle and end in a subsequent half-cycle to allow a most flexible control. In addition, the present embodiment allows a further improved operation in case of a capacitive ballast, as discussed in the following with reference to FIG. 12-14.

To allow setting the power consumption of the lamp 1, the microprocessor 102 is programmed to control the MOSFET 101. The microprocessor 102 determines the power of the LED lamp 1 in regular intervals by a measurement of the voltage detector 106 and the current detector 104. The corresponding result is filtered, so that the average power consumption of the LED unit 7' is determined. The microprocessor 102 compares the average power consumption of the LED unit 7' with the predefined compensation value. According to the present embodiment, the predefined compensation value is factory set in a memory (not shown), accessible to the microprocessor 102 according to the rating, i.e. the power consumption of the LED unit 7', which corresponds to the desired flux of the LEDs 44. Based on the calculation, the microprocessor 102 determines said first and second delay periods to set the first timer and the second timer.

The MOSFET 101 is then accordingly controlled in each half cycle of the current 51. The microprocessor 102 determines the zero-crossing 55 of the input current 51 using current detector 120. Upon the detection of a zero-crossing 55, the first timer is activated, which sets the MOSFET 101 to the conducting state after the first delay period. Furthermore, the first timer triggers the second timer. After expiration of the second delay period, the second timer controls the MOSFET 101 to the non-conducting state. The control cycle is then subsequently repeated in each half cycle of current 51. Upon a detection of a change of the power consumption of the LED unit 7' e.g. due to temperature or aging, the first and second delay periods are accordingly adjusted.

Since the microprocessor 102 is supplied with signals corresponding to present voltage and current levels, it is possible to synchronize to the mains frequency and to compensate for distortions of the zero-crossing 55. The present embodiment using said microprocessor 102 further allows to provide filtering and smoothing of the power, delivered to the LED unit 7'. For example, the microprocessor 102 may alternatively or additionally be programmed with a third timer, measuring the time interval between subsequent zero-crossings 55. By comparing the point in time when the real zero-crossing 55 occurs to the expected point in time, e.g. according to the previous timing of the zero-crossings 55, a distortion or disturbance is detected. Applying a fixed shunt timing to a unsymmetrical waveform might result in pulsation of the light output and/or an amplification of the distortion.

The present embodiment therefore allows to determine a DC offset in the mains supply or any other distortion resulting in a build up of a DC magnetizing current, e.g. in a magnetic (uncompensated or parallel compensated) ballast. In case of such distortion, the timing of the shunt period 57 is adapted with respect to the timing of the zero-crossing 55. The control unit 10' thus is provided to detect and compensate some distortion, or at least accept said distortion without further amplification.

In the event that the detected distortion is higher than a predefined distortion limit, the operation of the lamp 1 is suspended, e.g. by a resettable fuse (not shown), so that the connection of the LED unit 7'" to power is disrupted to prevent excessive DC input current.

Figure 12:
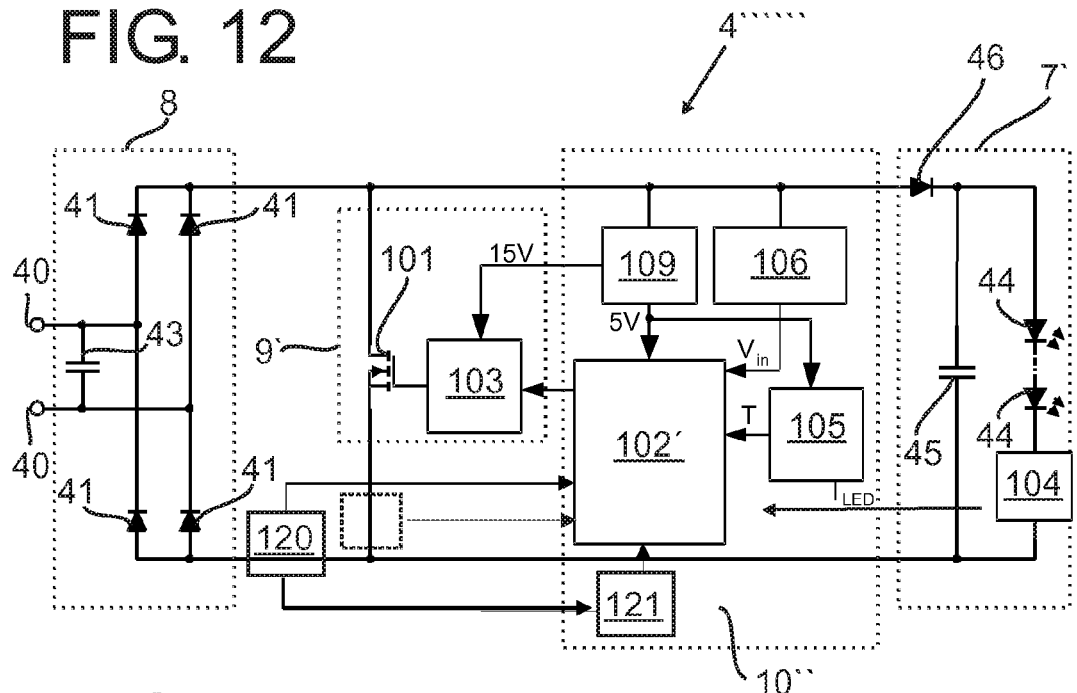
FIG. 12 shows a schematic diagram of an electric lamp circuit according to a seventh embodiment.

FIG. 12 shows a seventh embodiment of a lamp circuit 4'''" for the LED lamp 1 in a further schematic diagram. The embodiment of FIG. 12 corresponds to the embodiment of FIG. 10 with the exception of a low pass filter 121 to provide the average current consumption of the circuit 4'''" to the microprocessor 102'. The current detector 120 is further adapted to detect the zero-crossing 55 and to provide a corresponding signal to the microprocessor 102'. As shown, the second current detector 120 may alternatively be provided to measure the current through the compensation circuit and thus the switching device 9' and MOSFET 101. The overall current may then be determined by a simple addition of the current through the switching device 9' and a LED unit 7'.

According to the present embodiment, the microprocessor 102' is programmed to operate in a first detection mode, e.g.

upon connection of the LED lamp 1 with a fixture 20, 20' and thus with the power supply 22.

In the first detection mode, it is determined whether the LED lamp 1 is connected to an inductive ballast, as e.g. shown in FIG. 2a, or to a capacitive ballast, e.g. the capacitive branch of fixture 20', as shown in FIG. 2b. Since when operating the lamp 1 with a capacitive ballast, the current 51 leads the line voltage 52, the timing of reactive phase 54 and effective phase in each half cycle is opposite to the phasing in an inductive ballast, shown in FIG. 5a.

Figure 14:
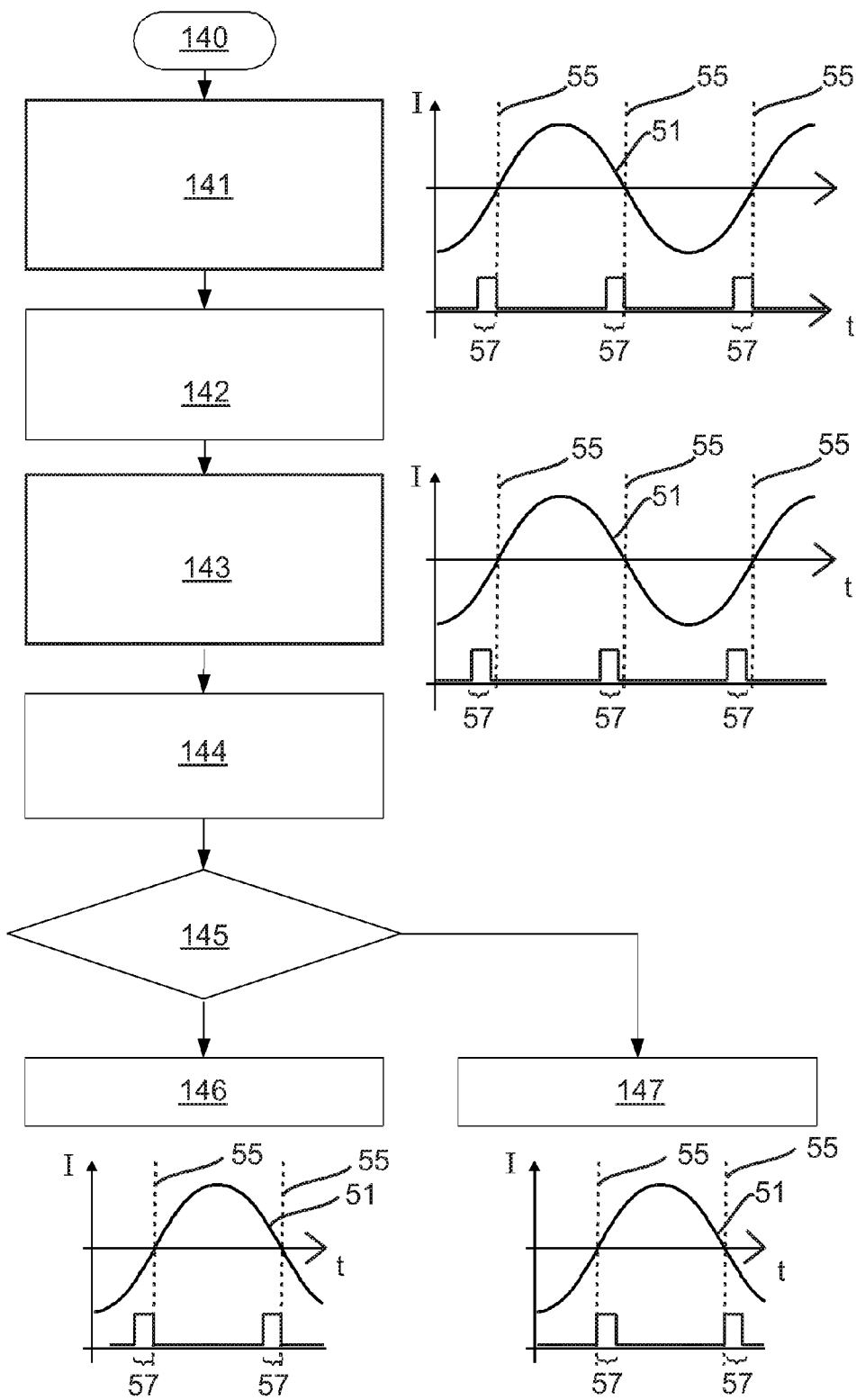
FIG. 14 shows a flow chart of the operation according to the embodiment of FIG. 12.

FIG. 14 shows a flowchart of the operation of the circuit 4'''' of FIG. 12 during the first detection mode. As discussed above, the first detection mode starts with step 140 upon connection of the LED lamp 1 with a fixture 20, 20'. The microprocessor 102' controls the switching device 9' in step 141 according to a first set of control parameters, so that the shunt end time corresponds to a zero-crossing 55 of the alternating current, i.e. in a leading edge control mode. The present control is maintained over a plurality of cycles of the alternating current 51, so that the lamp power is stabilizes. In step 142, the second current detector 120 determines the average lamp current and the microprocessor 102' correspondingly determines the average power consumption of the lamp 1.

Subsequently in step 143, the microprocessor 102' operates the switching device 9' with a second set of control parameters. As can be seen from the right side of FIG. 14, the shunt period 57 according to the operation of step 143 is offset with respect to the operation in step 141, e.g. by 2 ms. After some cycles of the alternating current the average current is again determined using the second current detector 120 in step 144.

The microprocessor 102' then determines in step 145 whether the determined current of step 142 is less than the current determined in step 144. If this is the case, an inductive ballast is determined. Accordingly, the switching device 9' is in step 146 controlled, so that said end of the shunt period corresponds to the zero-crossing 55 of the alternating current, i.e. leading edge control. Thus, it is assured that the shunt period 57 is set to the reactive phase of current 51, so that the current in the inductor 25 does not substantially increase when short-circuiting the LED unit 7'. The control thus provides reduced ballast loss.

On the other hand, if the current, measured in step 142 is higher than the current of step 144, a capacitive ballast is determined. Here, the switching device 9' is in step 147 controlled, so that the shunt begin time corresponds to the zero-crossing 55 of the alternating current, i.e. a trailing edge control mode. Accordingly, the shunt period 57 is again set to the reactive phase of current 51 when operating the lamp 1 with a capacitive ballast.

The first detection mode then ends and the switching device 9' is operated with the determined control mode. The duration of the shunt period 57 is controlled according to the measured power consumption of the LED unit 7', as explained with reference to FIG. 10. According to the embodiment discussed above, the current through the lamp is determined to select the timing control method corresponding to the respective ballast type. In case the current, measured in steps 142 and 144 does not substantially differ from each other, a further criterion to select the appropriate control method is to determine the timing of the zero-crossing 55, as discussed above with reference to FIG. 10. Therefore, the microprocessor 102' may additionally or alternatively be adapted to determine the point in time of subsequent zero-crossings 55 in steps 142 and 144 to determine which set of control parameters according to steps 141 and 143 provides the least distortion in the alternating current 51 and then controls the switching device 9' accordingly.

Figure 15:
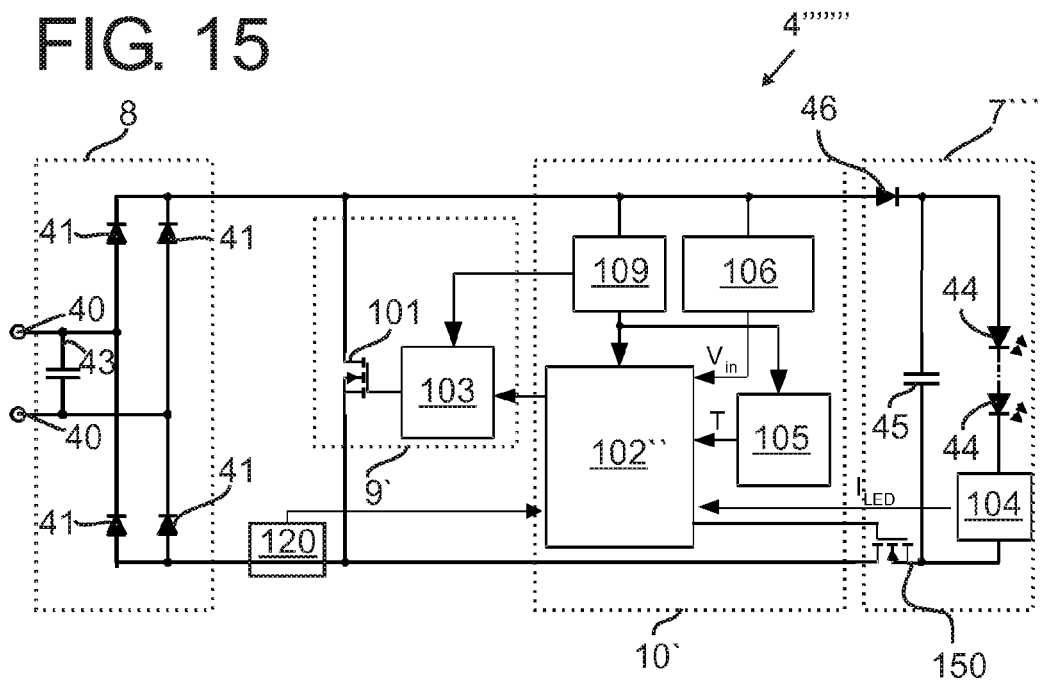
FIG. 15 shows a schematic diagram of an electric lamp circuit according to an eighth embodiment.

FIG. 15 shows an eighth embodiment of a lamp circuit 4''''' of an LED lamp 1 in a further schematic diagram. The embodiment of FIG. 15 corresponds to the embodiment of FIG. 10 with the exception of an additional MOSFET load switch 150, connected with the microprocessor 102'' over a gate driver (not shown). The switch 150 allows to control the connection of the LED lamp 7''' with power and allows to determine the voltage in an idle state using the voltage detector 106. Certainly the gate driver, although not shown, is connected with the low voltage power supply 109 during operation.

According to the present embodiment, the microprocessor 102'' is programmed to operate in a second detection mode, e.g. upon connection of the LED lamp 1 with the power supply 22. The operation according to said second detection mode is particularly advantageous when operating the lamp 1 with fixture 20'' according to FIG. 16, which comprises a dual lamp rapid start ballast 26'', as typically used in 60 Hz mains grid systems.

Figure 16:
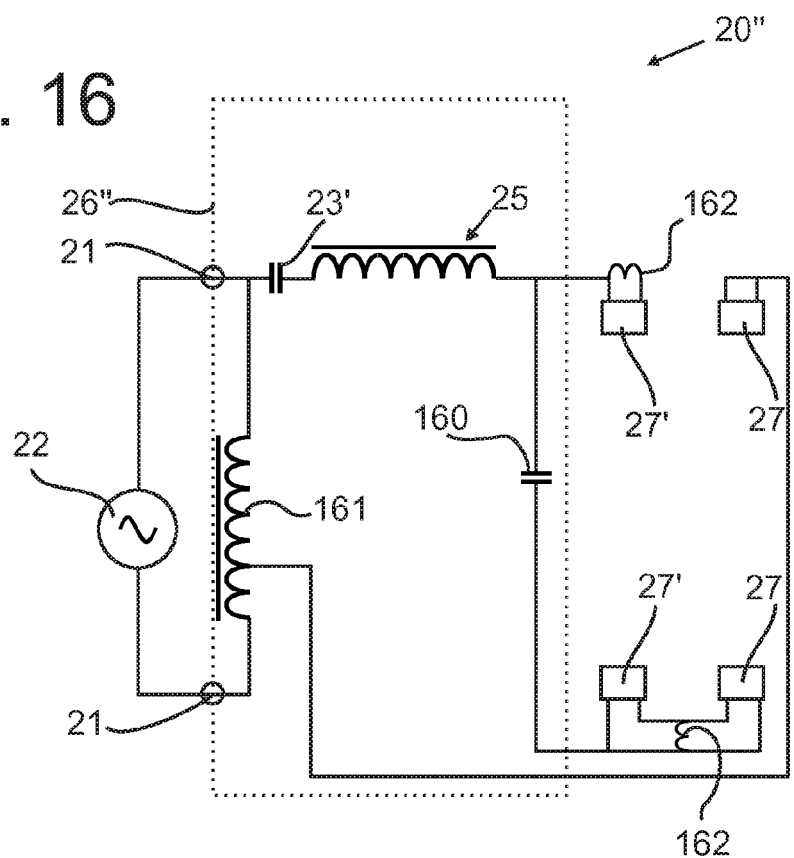
FIG. 16 shows a schematic circuit diagram of a third exemplary lamp fixture for use with the inventive LED lamp.

Fixture 20'' according to FIG. 16 is adapted to hold two lamps 1 and thus corresponds in general to the setup of fixture 20', shown in FIG. 2b. However, as will become apparent from the figure, the corresponding sockets 27, 27' are arranged, so that the lamps 1 are connected in series with each other. In addition to the above mentioned series inductance 25 and the capacitor 23', the rapid start type ballast 26'' further comprises a starting capacitor 160, which in combination with autotransformer 161 and auxiliary cathode heater circuits 162 allows igniting fluorescent lamps when attached to fixture 20''.

While in the embodiment according to FIG. 2b the LED lamps 1 may operate independently from each other, due to the series connection of the LED lamps 1 according to the setup of fixture 20'' a simultaneous operation of MOSFETs 101 of both installed lamps 1 and thus overlapping shunt periods 57 should be avoided to enhance the power factor of the overall setup.

In the second detection mode, it is thus determined, whether the lamp 1 is connected to sockets 27 (right side in FIG. 16) or to sockets 27' (left side) and to control the lamp either according to a third set of timing control parameters or to a fourth set of timing control parameters to avoid simultaneous operation of MOSFETs 101 of both installed lamps 1 and thus simultaneous shunting.

Figure 18:
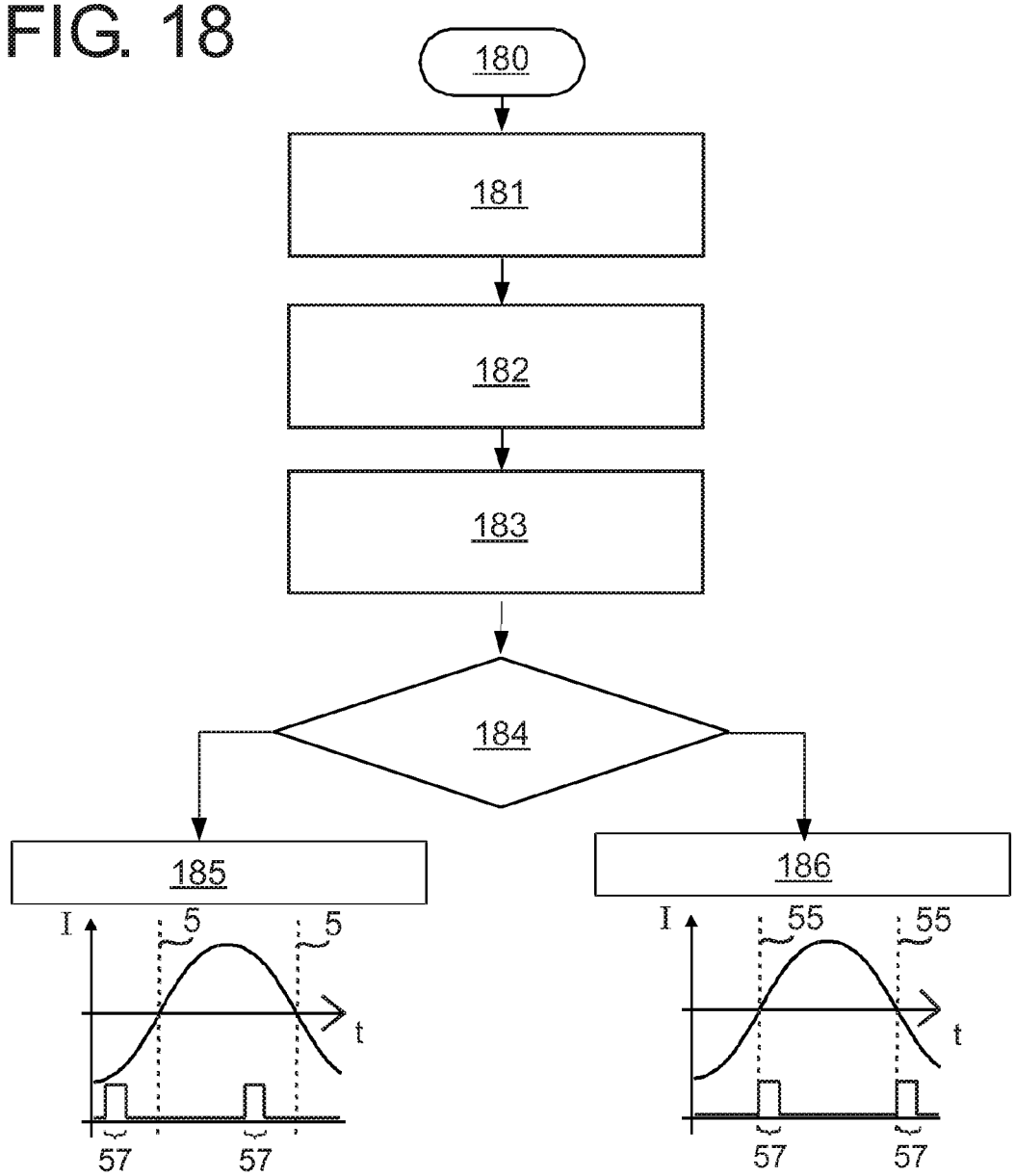
FIG. 18 shows a flow chart of the operation according to the embodiment of FIG. 15.

FIG. 18 shows a flowchart of the operation of the circuit 4''''' during the second detection mode. The operation in the second detection mode starts in step 180 upon connection of the LED lamp 1 with fixture 20'', i.e. with the power supply 22. The microprocessor 102'' then controls the load switch 150 and the switching device 9' to the open, non-conductive state in step 181. Subsequently, microprocessor 102'' queries the voltage detector 106 after some cycles of the alternating current in step 182 to determine the idle voltage at the LED lamp 1 without the LED unit 7''' being connected with power and thus in said idle state. The load switch 150 is then closed, i.e. brought into a conductive state in step 183.

The microprocessor 102'' determines in step 184, whether the idle voltage, determined in step 182 is equal to or higher than a voltage threshold of 175 Volt, set according to the present example of rapid start ballast 26''. In case the idle voltage is equal to or higher than the voltage threshold, it is determined that the lamp 1 is connected to sockets 27 of the fixture 20'', i.e. the right hand side of FIG. 16. According to the present example, the switching device 9' is in this case operated according said third set of parameters (step 186) so that the shunt begin time corresponds to the zero-crossing 55 of the alternating current, i.e. trailing edge control.

In the respective other case that the idle voltage is lower than the voltage threshold, it is determined that the lamp 1 is connected to sockets 27' of the fixture 20" and thus the left hand side of FIG. 16. Here, the switching device 9' is operated according to said fourth set of parameters (step 185) with dual edge control, i.e. both, shunt begin and shunt end time do not correspond to the zero-crossing 55. The second detection mode then ends and the switching device 9' is operated according to the determined set of control parameters.

When according to the above, two lamps 1 are correspondingly operated according to the second detection mode in a dual lamp rapid start type fixture 10" according to FIG. 16, it follows that one of the lamps 1 is operated with trailing edge control and the respective other lamp is operated with dual edge control. Accordingly and as can be seen from the timing diagram of FIG. 17, the shunt period 57a of said first lamp 1 does not overlap with the shunt period 57b of said second lamp 1 in each half cycle of the operating current 51 or the corresponding output current 53 of rectifier 8, shown in FIG. 17. The present embodiment thus provides a high power factor when the lamp 1 is operated in a rapid start type ballast 26".

Although the above operation in the first detection mode according to FIG. 14 and the second detection mode according to FIG. 18 have been described separately for reasons of clarity, it is nevertheless possible to operate the invention in an embodiment where both detection modes are employed to obtain a highly versatile LED lamp 1.

Here, an installer may set the respective detection mode, using a user interface or switch. Alternatively or additionally and in view that the above type of dual lamp rapid start ballast is typically employed in 60 Hz power grids while the inductive/capacitive types are used in 50 Hz power grids, the control unit 10' may further preferably comprise a frequency detector, so that the control unit 10' and the microprocessor 102" operates according to said first detection mode in case a 50 Hz alternating current is determined and according to said second detection mode in case a 60 Hz alternating current is determined.

The invention has been illustrated and described in detail in the drawings and the foregoing description. Such illustration and description are to be considered illustrative or exemplary and not restrictive; the invention is not limited to the disclosed embodiments. It may for example be possible to operate the invention according to an embodiment in which:

the LED unit 7, 7', 7", 7''' only comprises a single LED 44,
the LED unit 7, 7', 7", 7''' comprises an OLED or a laser diode as light emitting element,
the switching device 9, 9' and/or the control unit 10, 10', 10" are formed integrally with one of the lamp caps 5,
instead of rectifier 8, a rectification circuit is formed integrally with the LED unit 7, 7', 7", 7''',
the arrangement according to the embodiment of FIG. 9 is combined with one of the embodiments of FIG. 8, 8a or 8b, i.e. with a feedback circuit 60, 60' or 60",
in the embodiments of FIGS. 10, 12 and/or 15, the generation of the control signal for MOSFET 101 is realized by an analog timer circuit, controlled by microcontroller 102, 102', 102",
instead of a MOSFET 101, a bipolar transistor, IGBT or different type of controllable switch is used,
in the embodiments of FIGS. 10, 12 and/or 15 a user interface is provided, so that the predefined compensation value may be set by a user, in the embodiment of FIG. 12, alternatively or additionally to a determination of the current in steps 142 and 144, the power consumption of the LED unit 7' is determined and/or in the embodiment of FIG. 15, a voltage threshold different from 175 V is chosen or the voltage threshold is an exclude range.

The invention claimed is:

1. An LED retrofit lamp adapted for operation with an alternating current and a reactive lamp ballast, the lamp comprising
a LED unit,
a compensation circuit with a controllable switching device, connected parallel to said LED unit to provide an alternative current path and
a control unit, adapted to control said switching device in a compensation mode, in which said switching device is set to a conducting state for the duration of a shunt period in each half cycle of said alternating current,
wherein said control unit is configured to adapt the power consumption of the LED unit to a predefined compensation value; and
wherein, when applied in combination with the reactive lamp ballast, said switching device is set to the conducting state during a reactive phase of said alternating current.

2. The LED retrofit lamp according to claim 1, wherein said switching device is controlled so that a shunt begin time or shunt end time of said shunt period corresponds to a zero-crossing of said alternating current.

3. The LED retrofit lamp according to claim 1, wherein said switching device is a self-latching switching device.

4. The LED retrofit lamp according to claim 1, wherein said control unit comprises a detector to determine a zero-crossing of said alternating current.

5. The LED retrofit lamp according to claim 1, wherein said control unit is adapted to control a shunt begin time of said shunt period, so that said switching device is set to the conducting state after a first delay period after a zero-crossing of said alternating current.

6. The LED retrofit lamp according to claim 5, wherein said control unit is further adapted to control a shunt end time of said shunt period, so that said switching device is set to a non-conducting state after a second delay period after a shunt begin time of said shunt period.

7. The LED retrofit lamp according to claim 5, wherein said control unit comprises feedback circuitry to measure a current and/or voltage of said LED lamp.

8. The LED retrofit according to claim 7, wherein said control unit is adapted to control the duration of said shunt period according to said measured current and/or voltage.

9. The LED retrofit lamp according to claim 7, wherein said control unit is further adapted to operate in a first detection mode, in which
the switching device is operated with a first set of timing control parameters, so that a shunt end time of said shunt period corresponds to a zero-crossing of said alternating current,
the current of said LED lamp is determined,
the switching device is operated with at least a second set of timing control parameters, so that said shunt end time does not correspond to a zero-crossing of said alternating current,
the current of said LED lamp is determined and
in case the determined current according to said first set is less than the determined current according to said second set, the switching device is operated with said first set of timing control parameters.

10. The LED retrofit lamp according to claim 7, further comprising a controllable load switch, arranged in series with said LED unit to at least temporarily disconnect said LED unit from power.

11. The LED retrofit lamp according to claim 10, wherein said control unit is adapted to operate in a second detection mode, in which
- the load switch is controlled to disconnect said LED unit from power,
- the voltage at said LED lamp is determined and compared with a voltage threshold and
- in case the determined voltage is equal to or higher than said voltage threshold, the switching device is operated with at least a third set of timing control parameters and
- in case the determined voltage is lower than said voltage threshold, the switching device is operated with at least a fourth set of timing control parameters, wherein the shunt period according to said third set of timing control parameters in each half cycle of said alternating current does not substantially overlap with the shunt period according to said fourth set of timing control parameters.

12. The LED retrofit lamp according to claim 10, wherein the control unit further comprises a frequency detector, so that the control unit operates according to said first detection mode in case a 50 Hz alternating current is determined and according to said second detection mode in case a 60 Hz alternating current is determined.

* * * * *